(12) United States Patent
Chen et al.

(10) Patent No.: US 11,774,716 B2
(45) Date of Patent: Oct. 3, 2023

(54) OPTICAL IMAGING LENS DEVICE

(71) Applicant: GLORY SCIENCE CO., LTD., Taichung (TW)

(72) Inventors: Ping-Yi Chen, Taichung (TW); Hsi-Ko Yeh, Taichung (TW)

(73) Assignee: Glory Science Co., Ltd., Taichung (TW)

( * ) Notice: Subject to any disclaimer, the term of this patent is extended or adjusted under 35 U.S.C. 154(b) by 424 days.

(21) Appl. No.: 16/949,378

(22) Filed: Oct. 27, 2020

(65) Prior Publication Data

US 2022/0128797 A1  Apr. 28, 2022

(51) Int. Cl.
   *G02B 13/00* (2006.01)
   *G02B 27/00* (2006.01)
   *G02B 9/62* (2006.01)

(52) U.S. Cl.
   CPC ........... *G02B 13/0045* (2013.01); *G02B 9/62* (2013.01); *G02B 27/0025* (2013.01)

(58) Field of Classification Search
   CPC ........ G02B 9/62; G02B 9/64; G02B 13/0045; G02B 27/0025; G02B 15/146; H04N 5/222; H04N 5/2254
   USPC ......... 359/656–658, 708, 713, 749, 756–762
   See application file for complete search history.

(56) References Cited

U.S. PATENT DOCUMENTS

2011/0249349 A1* 10/2011 Asami ................. G02B 9/62
                                                       359/797
2021/0389569 A1* 12/2021 Lee .................... G02B 13/0045

* cited by examiner

*Primary Examiner* — Travis S Fissel
(74) *Attorney, Agent, or Firm* — Wang Law Firm, Inc.

(57) ABSTRACT

An optical imaging lens device includes, in order from an object side to an image side: a first lens element, a second lens element, a third lens element, a fourth lens element, a fifth lens element, a sixth lens element having an object-side surface being convex in a paraxial region thereof and an image-side surface being concave in a paraxial region thereof, the object-side and image-side surfaces of the sixth lens element being provided with at least one inflection point, at least one of the object-side and image-side surfaces of the sixth lens element having a sagittal height in a first axis, a sagittal height in a second axis and a sagittal height in a third axis, and at least two of these sagittal heights being different. The optical imaging lens device may meet the needs of miniaturization, wide field of view and low distortion.

12 Claims, 20 Drawing Sheets

OPTICAL IMAGING LENS DEVICE

BACKGROUND

Field of the Invention

The present invention relates to an optical system, and more particularly to an optical imaging lens device.

Description of the Prior Art

As the advanced semiconductor manufacturing technologies have allowed the performance of image sensors to be improved and the pixel size of the image sensors to be reduced and compact, optical lens devices with high image quality have become an indispensable part.

In addition, with the progress of science and technology, optical imaging lens device can be used on electronic devices in more fields, and the requirements for the optical imaging lens device are more diversified. Since the existing optical imaging lens device is not easy to balance the requirements of imaging quality, sensitivity, aperture stop size, volume or field of view, the present invention provides an optical imaging lens device to meet the requirements.

The present invention mitigates and/or obviates the aforementioned disadvantages.

SUMMARY

The primary objective of the present invention is to provide an optical imaging lens device having wide field of view and low distortion.

According to one aspect of the present invention, an optical imaging lens device comprises multiple lens elements each having an object-side surface facing an object side and an image-side surface facing an image side, and the multiple lens elements, in order from the object side to the image side, include: a first lens element with negative refractive power; a second lens element with positive refractive power having the image-side surface that is convex in a paraxial region thereof; a third lens element with negative refractive power, having the image-side surface that is concave in a paraxial region thereof; a fourth lens element with positive refractive power, having the object-side surface that is convex in a paraxial region thereof; a fifth lens element with positive refractive power, having the object-side surface that is convex in a paraxial region thereof; and a sixth lens element with negative refractive power, having the object-side surface that is convex in a paraxial region thereof, and the image-side surface that is concave in a paraxial region thereof, the object-side surface and the image-side surface of the sixth lens element being provided with at least one inflection point, at least one of the object-side surface and the image-side surface of the sixth lens element has a first sagittal height in a first axis, a second sagittal height in a second axis and a third sagittal height in a third axis, at least two of the first, second and third sagittal heights are different, and the first axis, the second axis and the third axis are not parallel to one another; wherein a focal length of the optical imaging lens device is f, a refractive index of the third lens element is N3, an Abbe number of the third lens element is V3, a focal length of the fourth lens element is f4, a refractive index of the fourth lens element is N4, an Abbe number of the fourth lens element is V4, a focal length of the fifth lens element is f5, a refractive index of the fifth lens element is N5, an Abbe number of the fifth lens element is V5, an Abbe number of the sixth lens element is V6, a refractive index of the sixth lens element is N6, a distance from the object-side surface of the first lens element to an image plane along the optical axis is TTL, a distance from the object-side surface of the first lens element to the image-side surface of the sixth lens element along the optical axis is FT. The following condition is satisfied:

$$0<(=|f/f5|-=|f/f4|)<1.3;$$

$$70<(V3/N3+V4/N4+V5/N5+V6/N6)<125; \text{ or}$$

$$0.4<(FT/TTL)<0.92.$$

According to another aspect of the present invention, a distance between the object-side surface and the image-side surface of the third lens element in the optical axis is CT3, a distance between the object-side surface and the image-side surface of the fourth lens element in the optical axis is CT4, the Abbe number of the third lens element is V3, the Abbe number of the fourth lens element is V4, the Abbe number of the fifth lens element is V5, the Abbe number of the sixth lens element is V6, the maximum imaging height of the optical imaging lens device is ImgH, a focal length of the second lens element is f2, a radius of curvature of the object-side surface of the fifth lens element is R9, a radius of curvature of the image-side surface of the fifth lens element is R10, a distance between the image-side surface of the third lens element and the object-side surface of the fourth lens element in the optical axis is T34, a distance between the image-side surface of the fourth lens element and the object-side surface of the fifth lens element in the optical axis is T45, the Abbe number of the fourth lens element is V4, the Abbe number of the sixth lens element is V6. The following condition is further satisfied:

$$0.1<CT3/CT4<0.5;$$

$$(V4+V5)-(V3+V6)>65;$$

$$(2*TTL)/\text{Img}H<2.35;$$

$$1<f2/f<1.24;$$

$$-1<(R9+R10)/(R9-R10)<0.8;$$

$$0.5<(T34+T45)*10/f|<2.5; \text{ or}$$

$$1.5<V4/V6<3.$$

According to yet another aspect of the present invention, at least one of the first, second, third, fourth and fifth lens elements is aspheric.

According to yet another aspect of the present invention, the object-side surface of the first lens element is convex in a paraxial region thereof, the image-side surface of the first lens element is concave in a paraxial region thereof, the object-side surface of the second lens element is convex in a paraxial region thereof; the object-side surface of the third lens element is convex in a paraxial region thereof, the image-side surface of the fourth lens element is concave in a paraxial region thereof, and the image-side surface of the fifth lens element is concave in a paraxial region thereof.

According to yet another aspect of the present invention, the object-side surface of the first lens element is convex in a paraxial region thereof, the image-side surface of the first lens element is concave in a paraxial region thereof, the object-side surface of the second lens element is convex in a paraxial region thereof; the object-side surface of the third lens element is convex in a paraxial region thereof, the image-side surface of the fourth lens element is convex in a paraxial region thereof, and the image-side surface of the fifth lens element is convex in a paraxial region thereof.

According to yet another aspect of the present invention, the object-side surface of the first lens element is convex in a paraxial region thereof, the image-side surface of the first lens element is concave in a paraxial region thereof, the object-side surface of the second lens element is convex in a paraxial region thereof; the object-side surface of the third lens element is convex in a paraxial region thereof, the image-side surface of the fourth lens element is concave in a paraxial region thereof, and the image-side surface of the fifth lens element is convex in a paraxial region thereof.

If |f/f5|−|f/f4| satisfies the above condition, the refractive power of the fourth lens element and the fifth lens element may be distributed better, the field of view may be increased and the sensitivity of assembly may be maintained at a suitable level. In addition, the optical imaging lens device may have a suitable back focal length.

If V3/N3+V4/N4+V5/N5+V6/N6 satisfies the above condition, the chromatic aberrations of the optical imaging lens device may be well corrected.

If FT/TTL satisfies the above condition, the image distortion and aberration caused by the wide field of view may be greatly reduced.

If CT3/CT4 satisfies the above condition, the thicknesses of the third lens element and the fourth lens element may be balanced to compress the converging distance of light, thereby shortening the total track length of the optical imaging lens device.

If (V4+V5)−(V3+V6) satisfies the above condition, it may be ensured that the chromatic aberration reaches a more balanced state in various aberrations.

If (2*TTL)/ImgH satisfies the above condition, the miniaturization of the optical imaging lens device may be achieved, so as to be used in light-weight portable electronic products.

If f2/f satisfies the above condition, the distortion caused by the wide field of view may be effectively reduced and the astigmatism may be corrected.

If (R9+R10)/(R9−R10) satisfies the above condition, the tolerance sensitivity of the optical lens system may be reduced, and the production yield may be increased.

If (T34+T45)*10/f satisfies the above condition, the maximal field of view of the optical imaging lens device may be effectively increased.

If V4/V6 satisfies the above condition, the image chromatic aberrations caused by a wide field of view may be effectively reduced.

The present invention will be presented in further details from the following descriptions with the accompanying drawings, which show, for purpose of illustrations only, the preferred embodiments in accordance with the present invention.

DETAILED DESCRIPTION

In the following detailed description, many specific details are elaborated to provide a thorough understanding of the invention. However, ordinary technicians in this field will understand that the invention can be practiced without these specific details. In other cases, well-known methods, processes and/or components are not described in detail to avoid making the invention unclear.

An optical imaging lens device comprises six lens elements each having an object-side surface facing an object side and an image-side surface facing an image side, and the six lens elements, in order from the object side to the image side, include: a first lens element, a second lens element, a third lens element, a fourth lens element, a fifth lens element and a sixth lens element.

The first lens element may have negative refractive power.

The second lens element may have positive refractive power and the image-side surface that is convex in a paraxial region thereof.

The third lens element may have negative refractive power and the image-side surface that is concave in a paraxial region thereof.

The fourth lens element may have positive refractive power and the object-side surface that is convex in a paraxial region thereof.

Figure 1A:
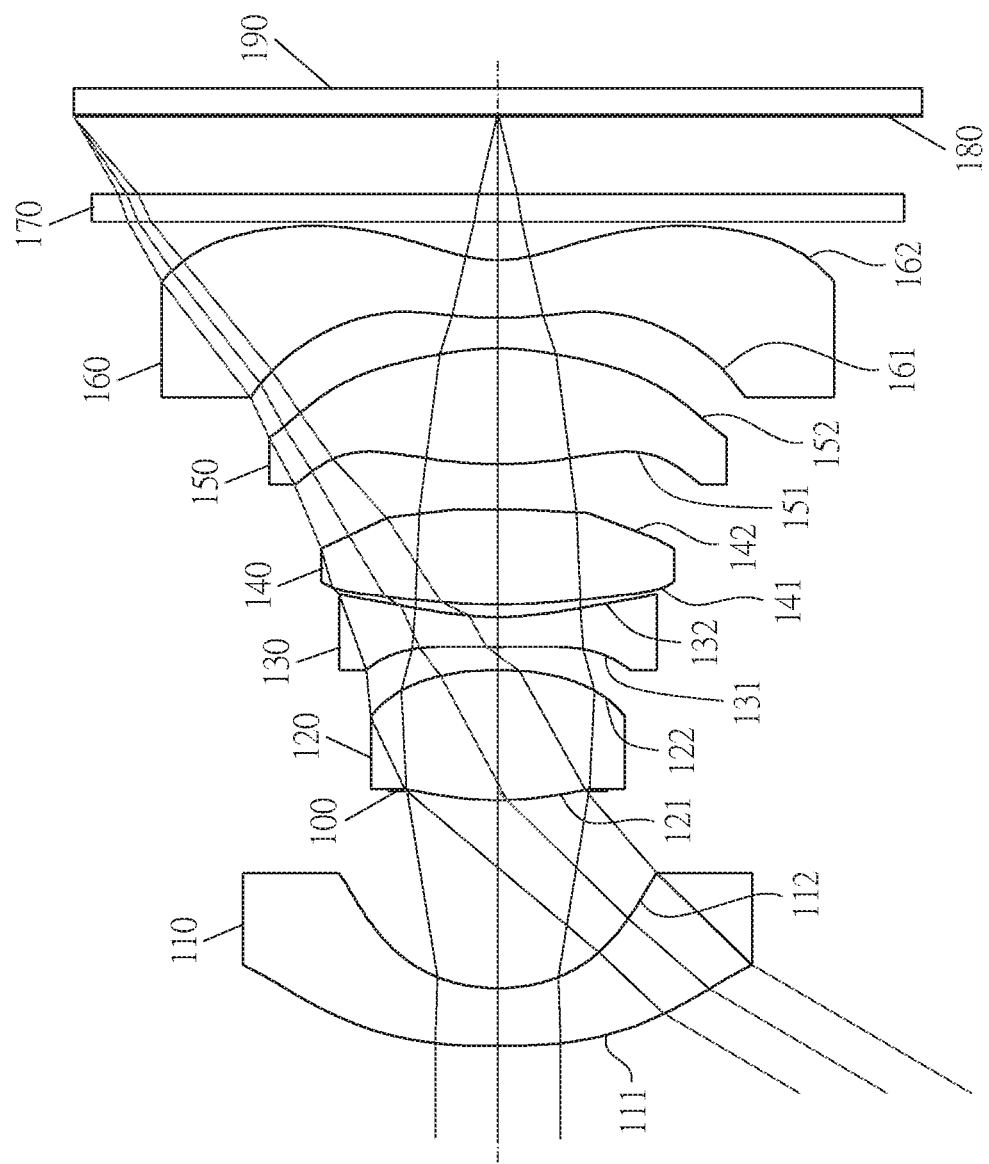
FIG. 1A is a schematic diagram showing an optical imaging lens device in a diagonal axis in accordance with a first embodiment of the present invention.
Figure 1B:
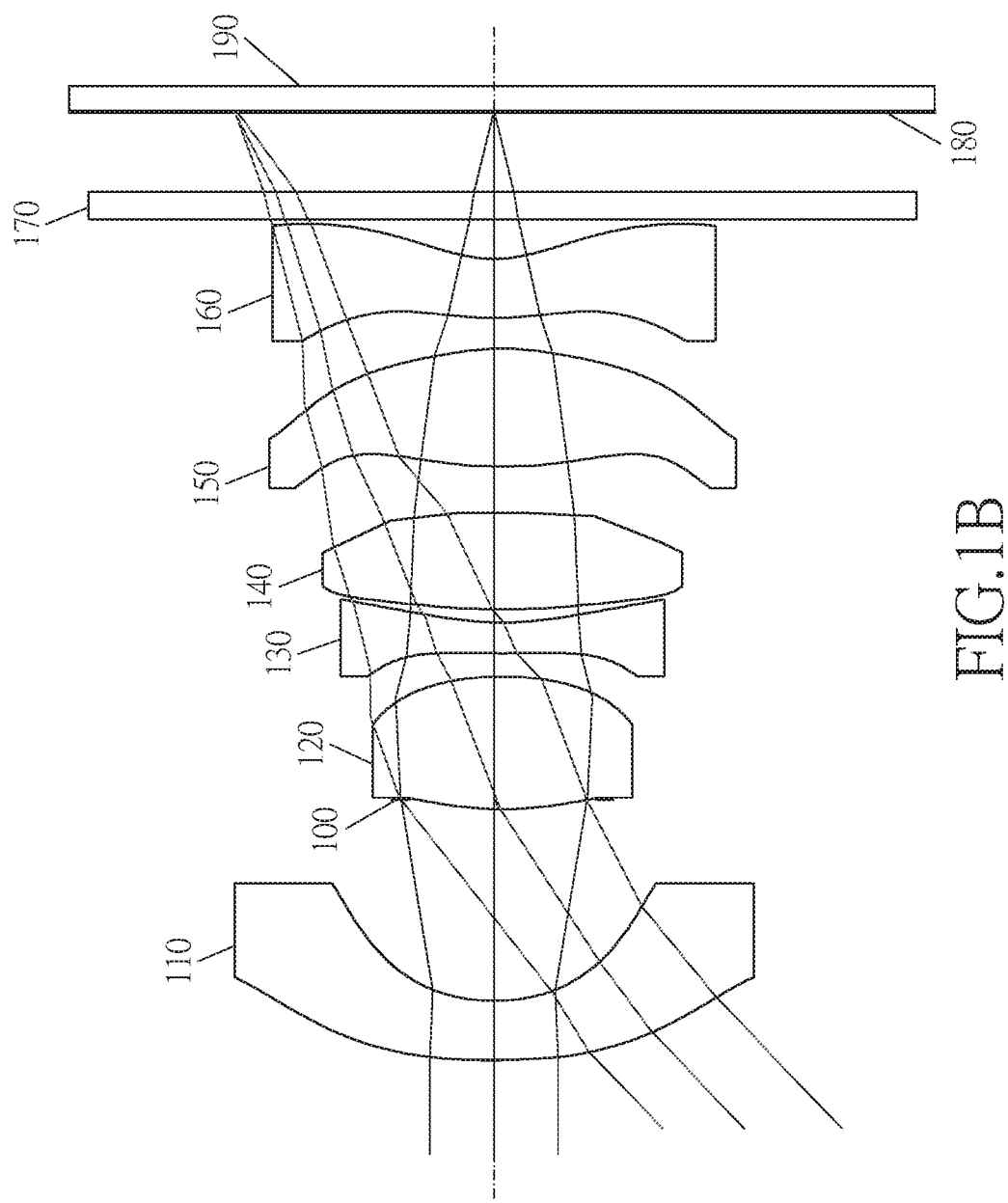
FIG. 1B is a schematic diagram showing the optical imaging lens device in a longitudinal axis in accordance with the first embodiment of the present invention.
Figure 1C:
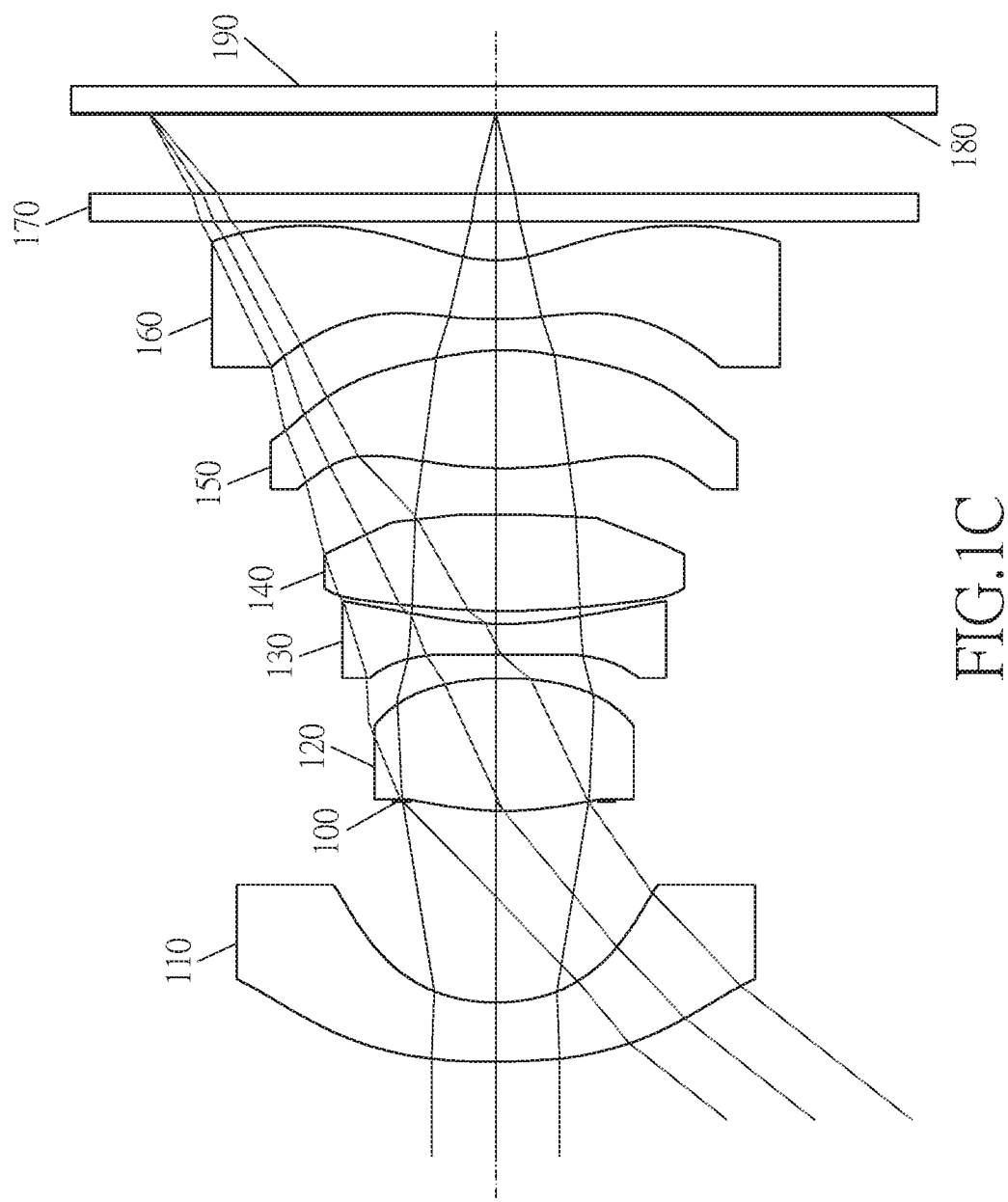
FIG. 1C is a schematic diagram showing an optical imaging lens device in a horizontal axis in accordance with the first embodiment of the present invention.
Figure 2A:
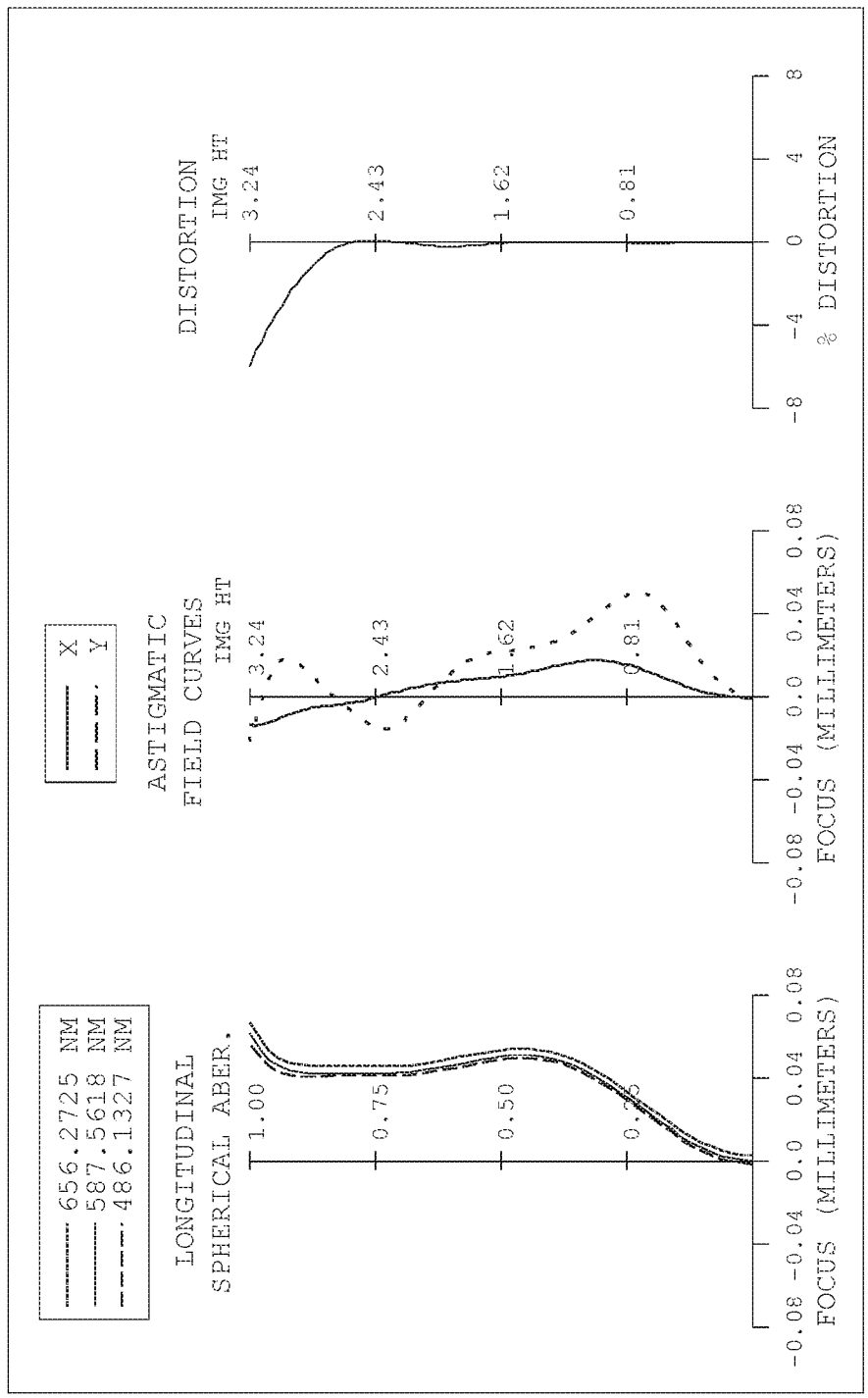
FIG. 2A is a schematic diagram showing the longitudinal spherical aberration curve, the astigmatic field curve and the distortion curve of the optical imaging lens device of the FIG. 1A according to the first embodiment.
Figure 2B:
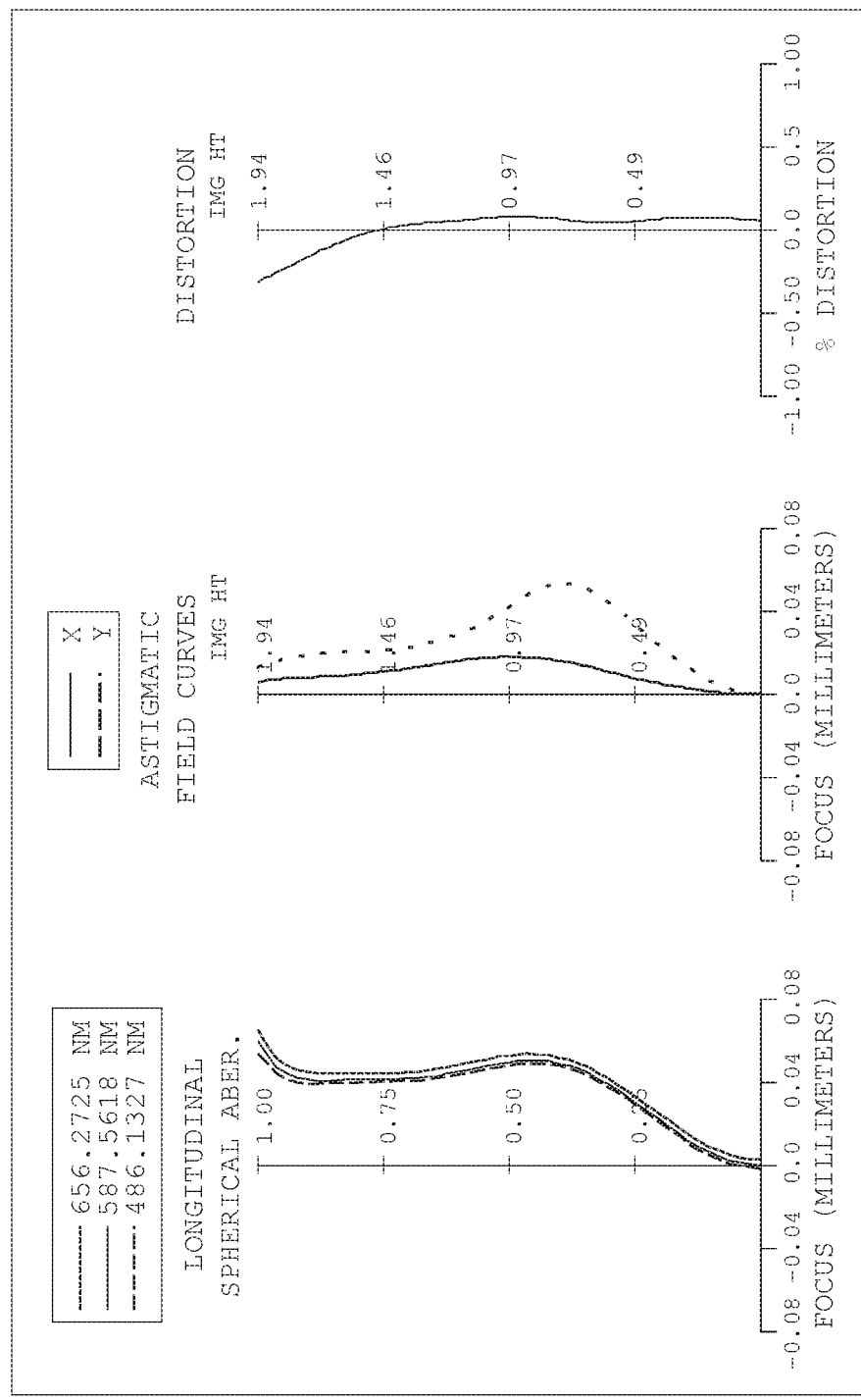
FIG. 2B is a schematic diagram showing the longitudinal spherical aberration curve, the astigmatic field curve and the distortion curve of the optical imaging lens device of the FIG. 1B according to the first embodiment.
Figure 2C:
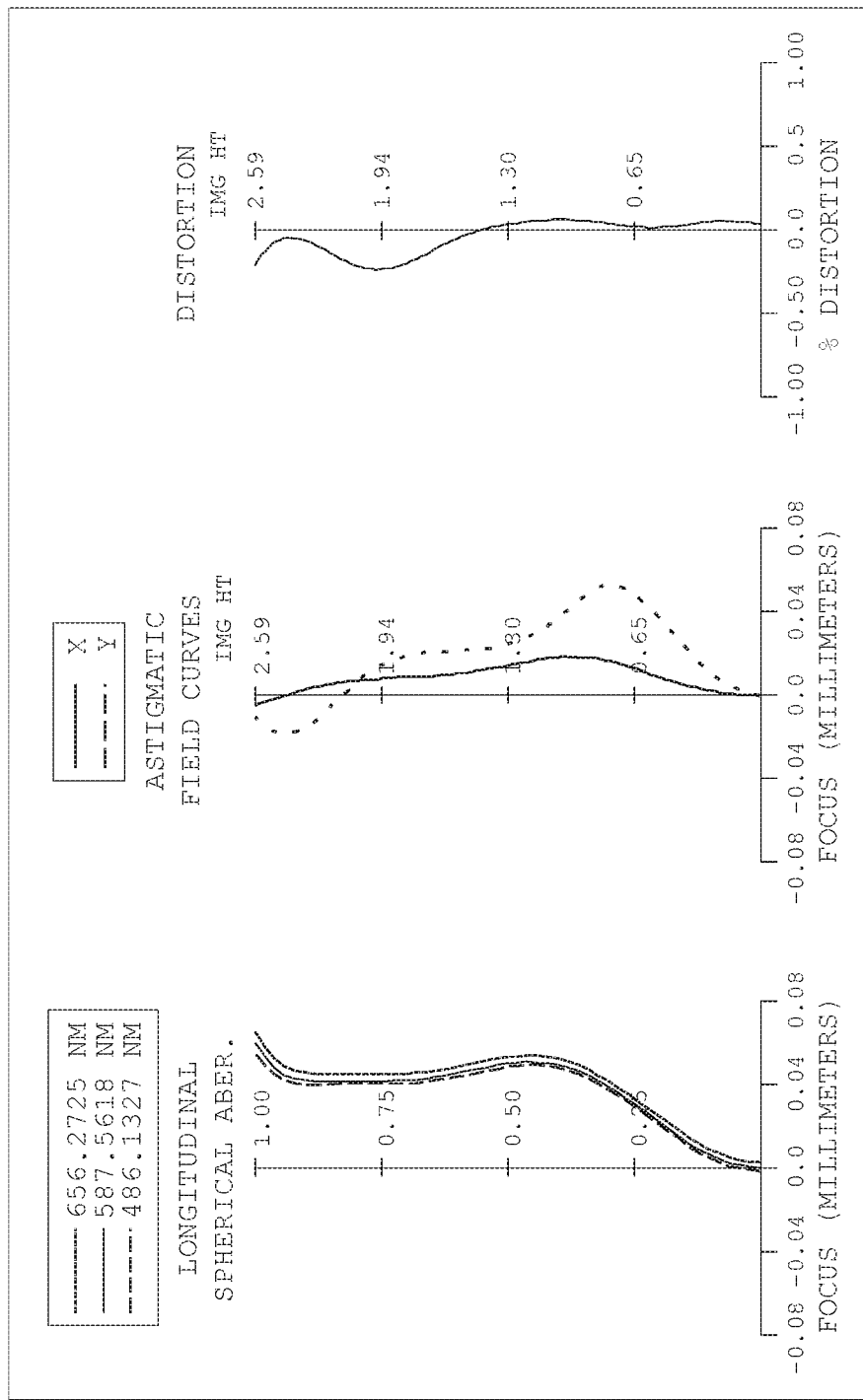
FIG. 2C is a schematic diagram showing the longitudinal spherical aberration curve, the astigmatic field curve and the distortion curve of the optical imaging lens device of the FIG. 1C according to the first embodiment.
Figure 3A:
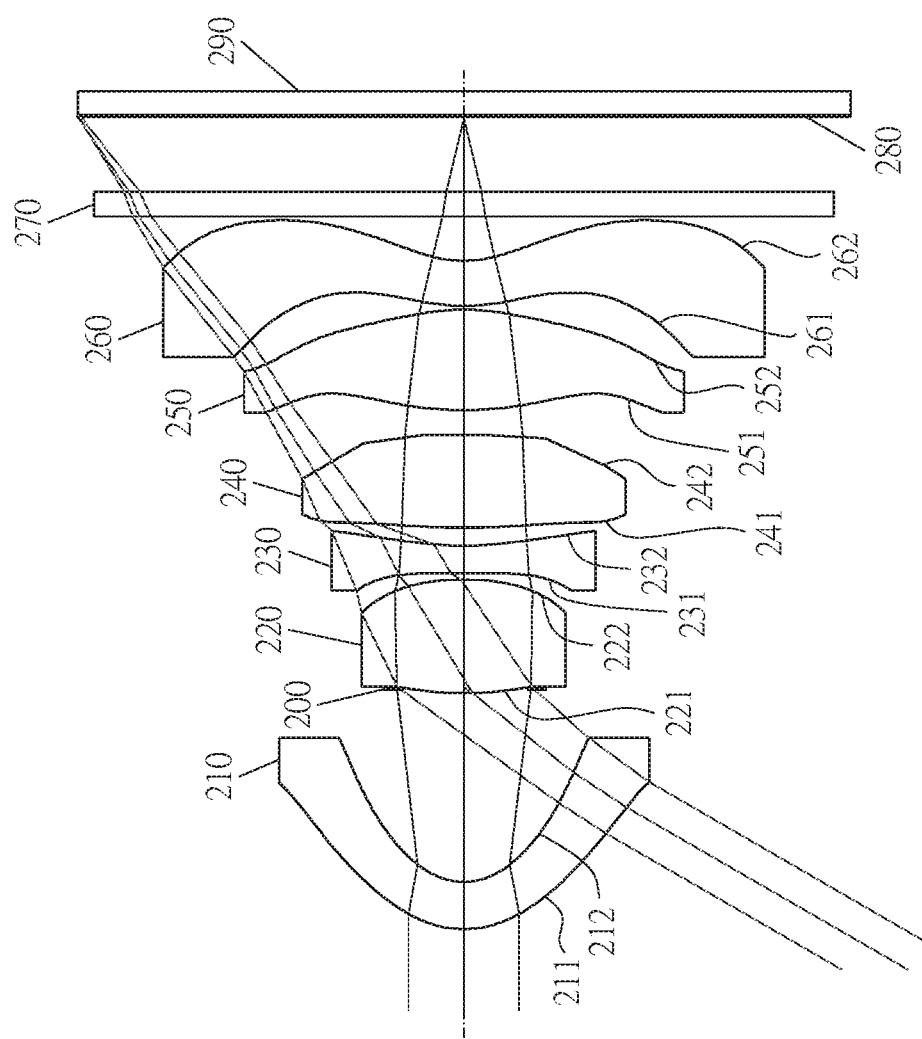
FIG. 3A is a schematic diagram showing an optical imaging lens device in a diagonal axis in accordance with a second embodiment of the present invention.
Figure 3B:
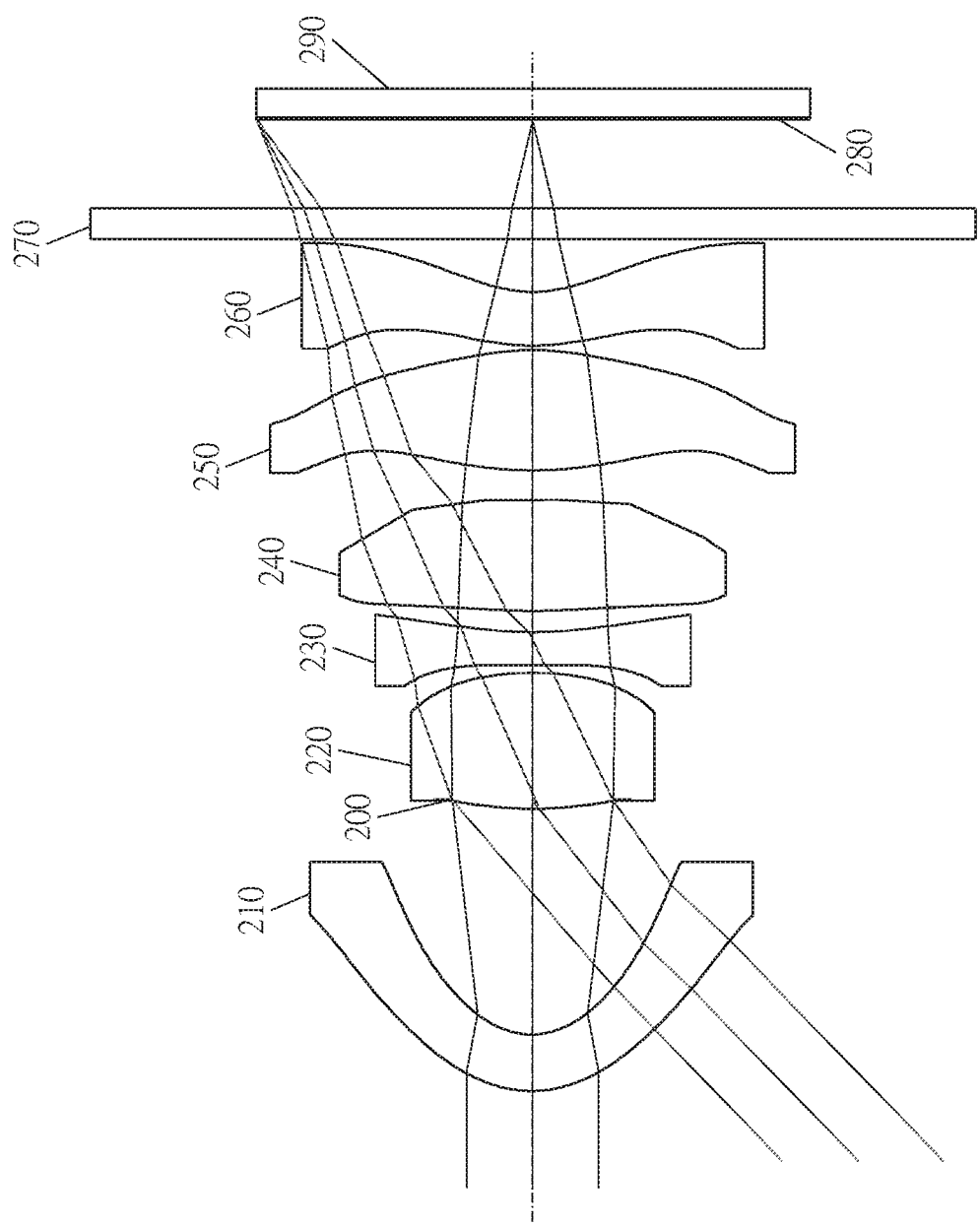
FIG. 3B is a schematic diagram showing the optical imaging lens device in a longitudinal axis in accordance with the second embodiment of the present invention.
Figure 3C:
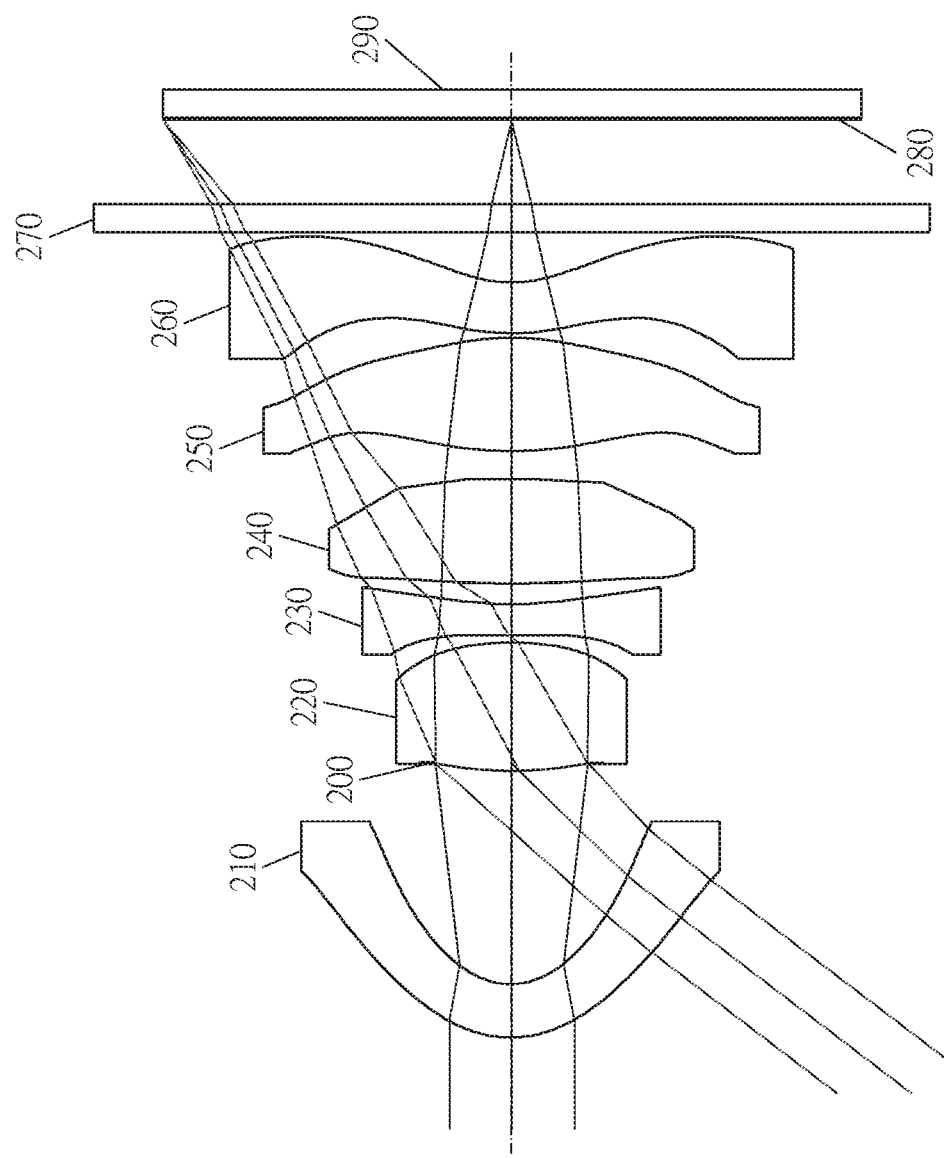
FIG. 3C is a schematic diagram showing an optical imaging lens device in a horizontal axis in accordance with the second embodiment of the present invention.
Figure 4A:
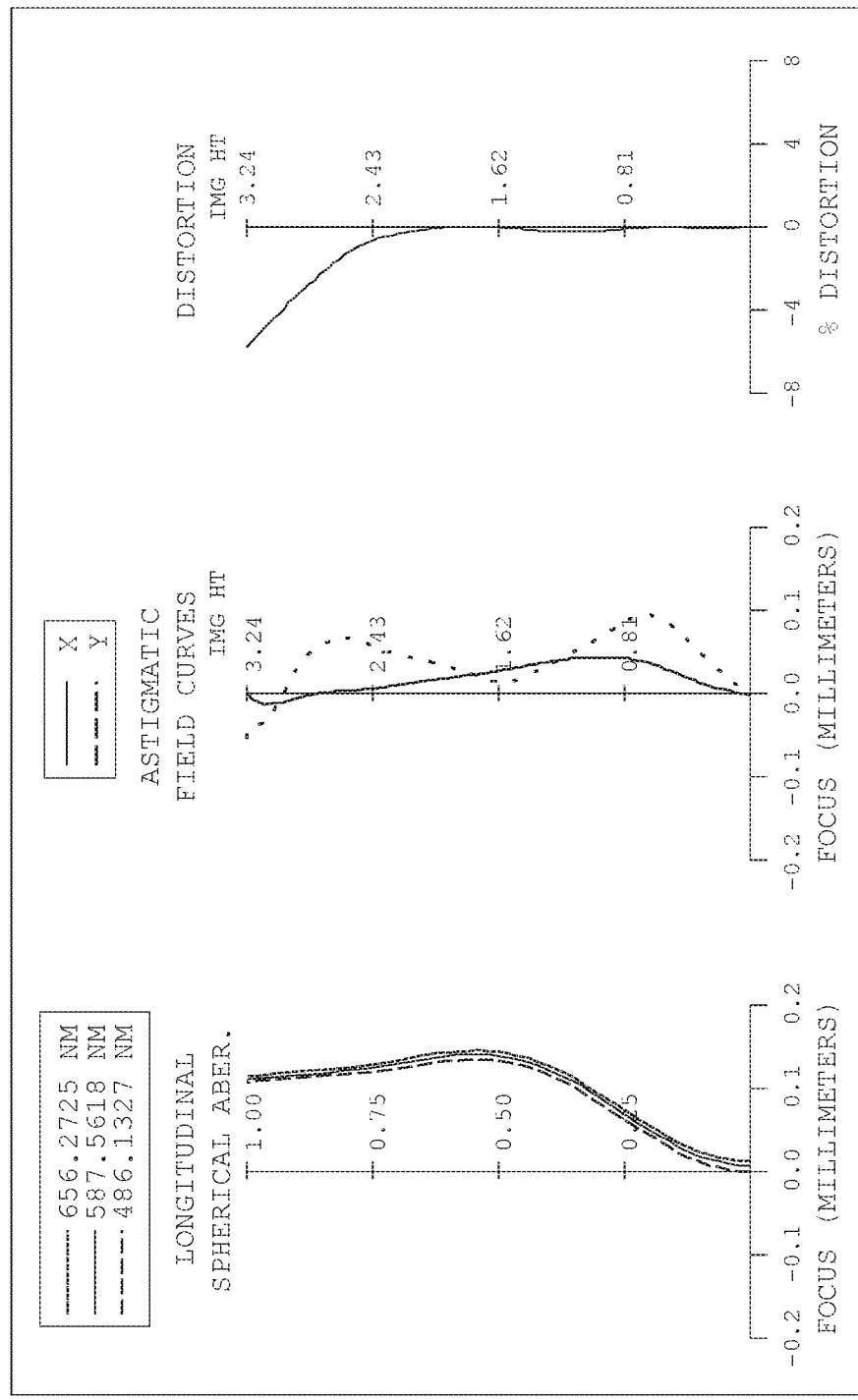
FIG. 4A is a schematic diagram showing the longitudinal spherical aberration curve, the astigmatic field curve and the distortion curve of the optical imaging lens device of the FIG. 3A according to the second embodiment.
Figure 4B:
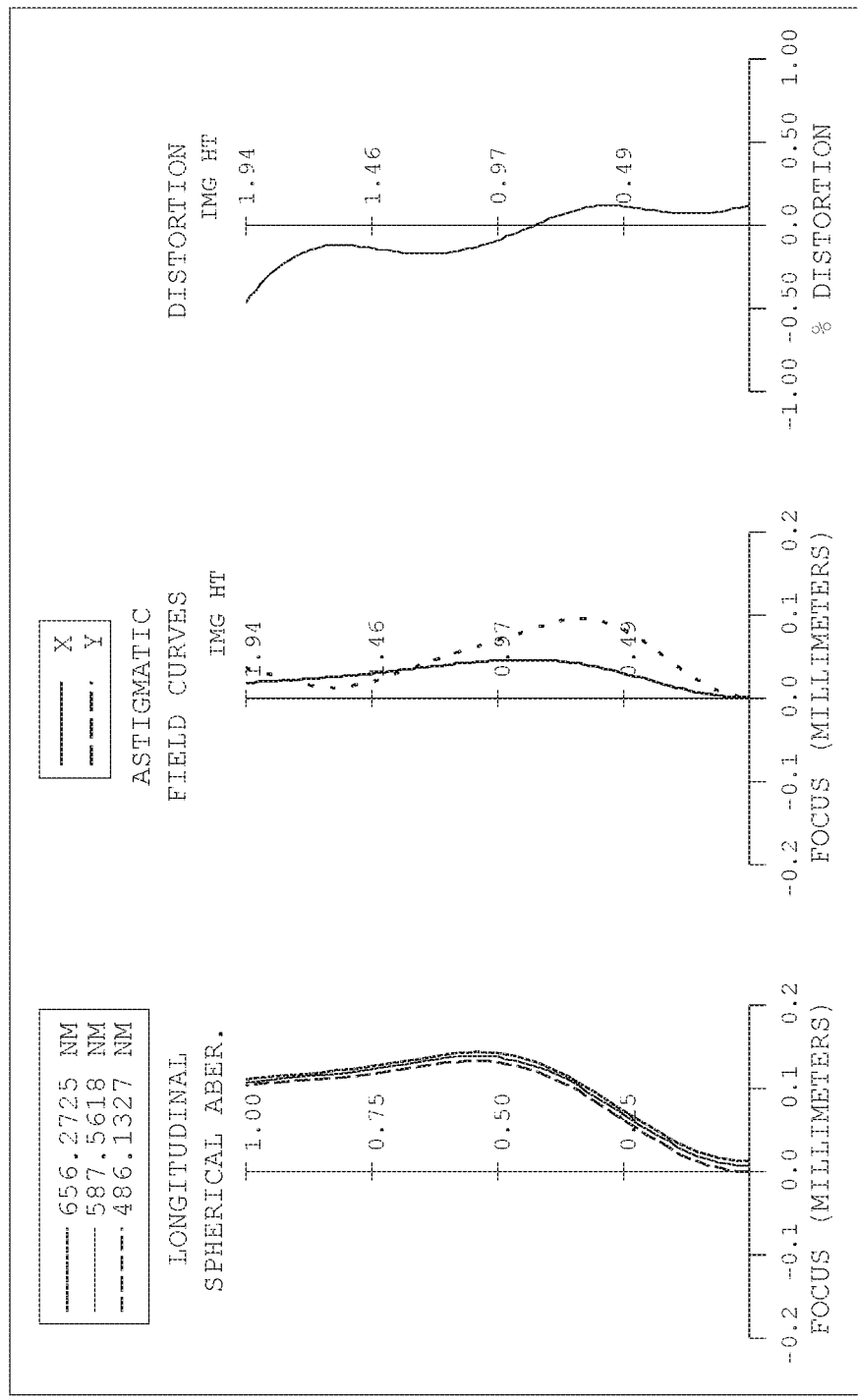
FIG. 4B is a schematic diagram showing the longitudinal spherical aberration curve, the astigmatic field curve and the distortion curve of the optical imaging lens device of the FIG. 3B according to the second embodiment.
Figure 4C:
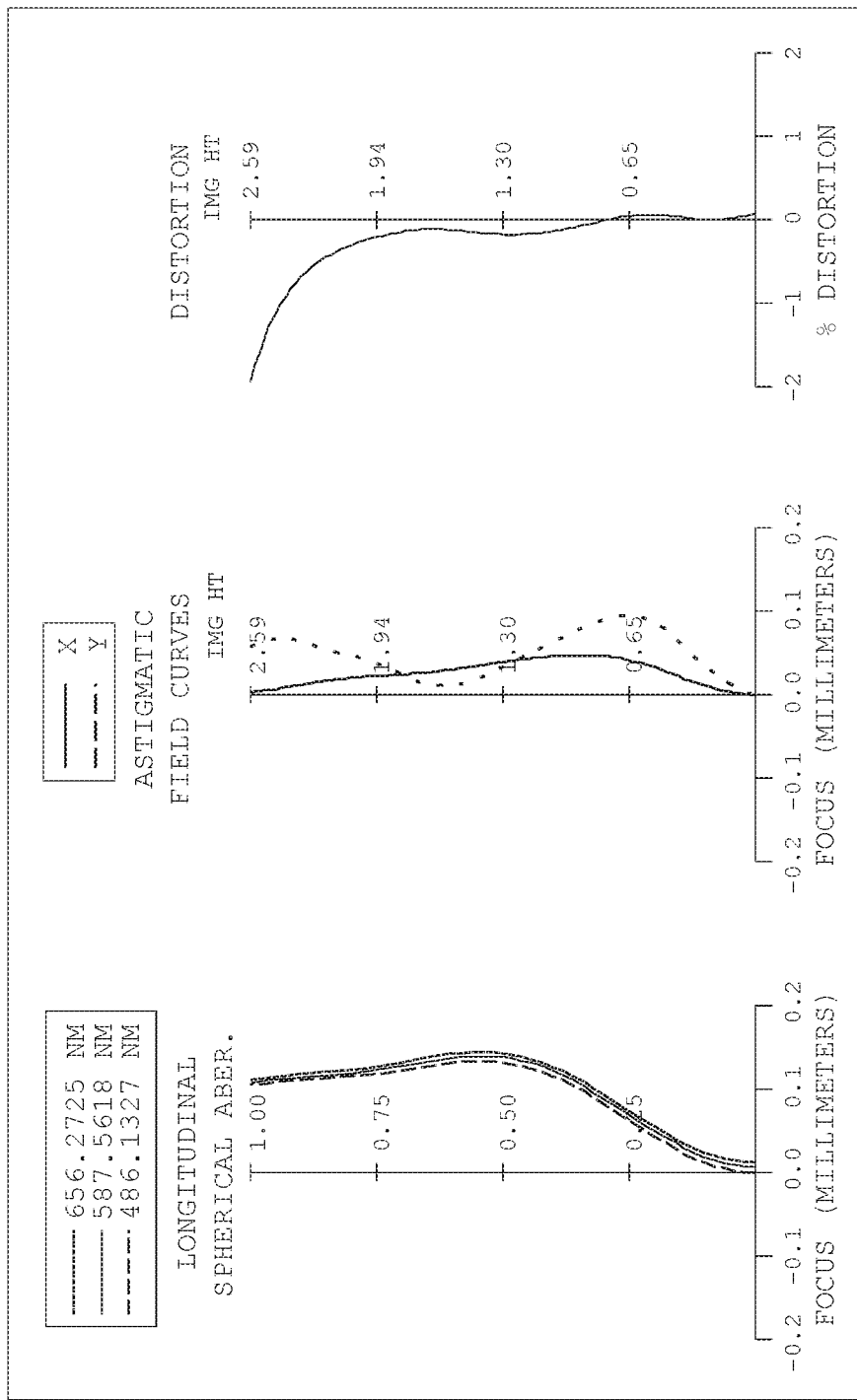
FIG. 4C is a schematic diagram showing the longitudinal spherical aberration curve, the astigmatic field curve and the distortion curve of the optical imaging lens device of the FIG. 3C according to the second embodiment.
Figure 5A:
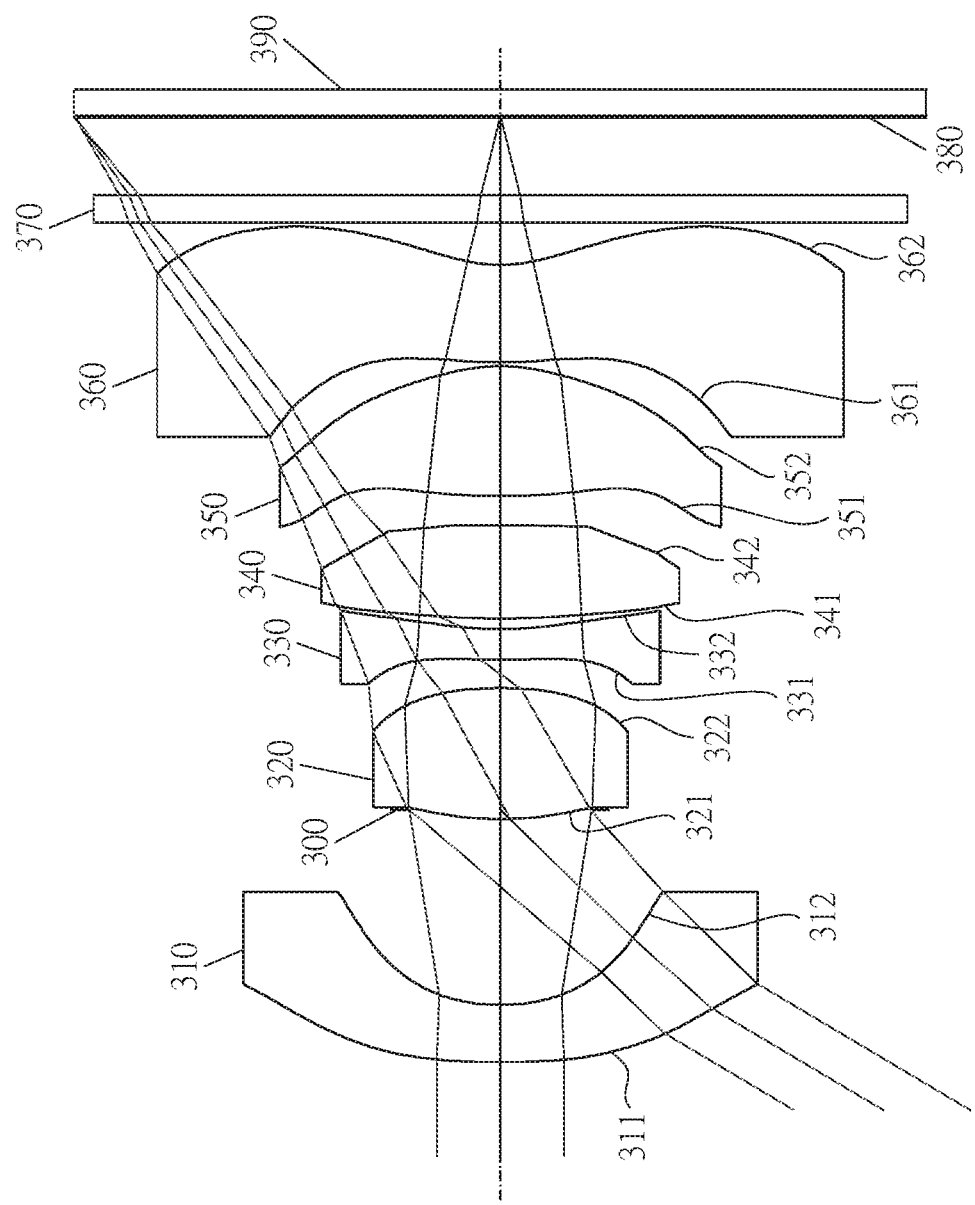
FIG. 5A is a schematic diagram showing an optical imaging lens device in a diagonal axis in accordance with a third embodiment of the present invention.
Figure 5B:
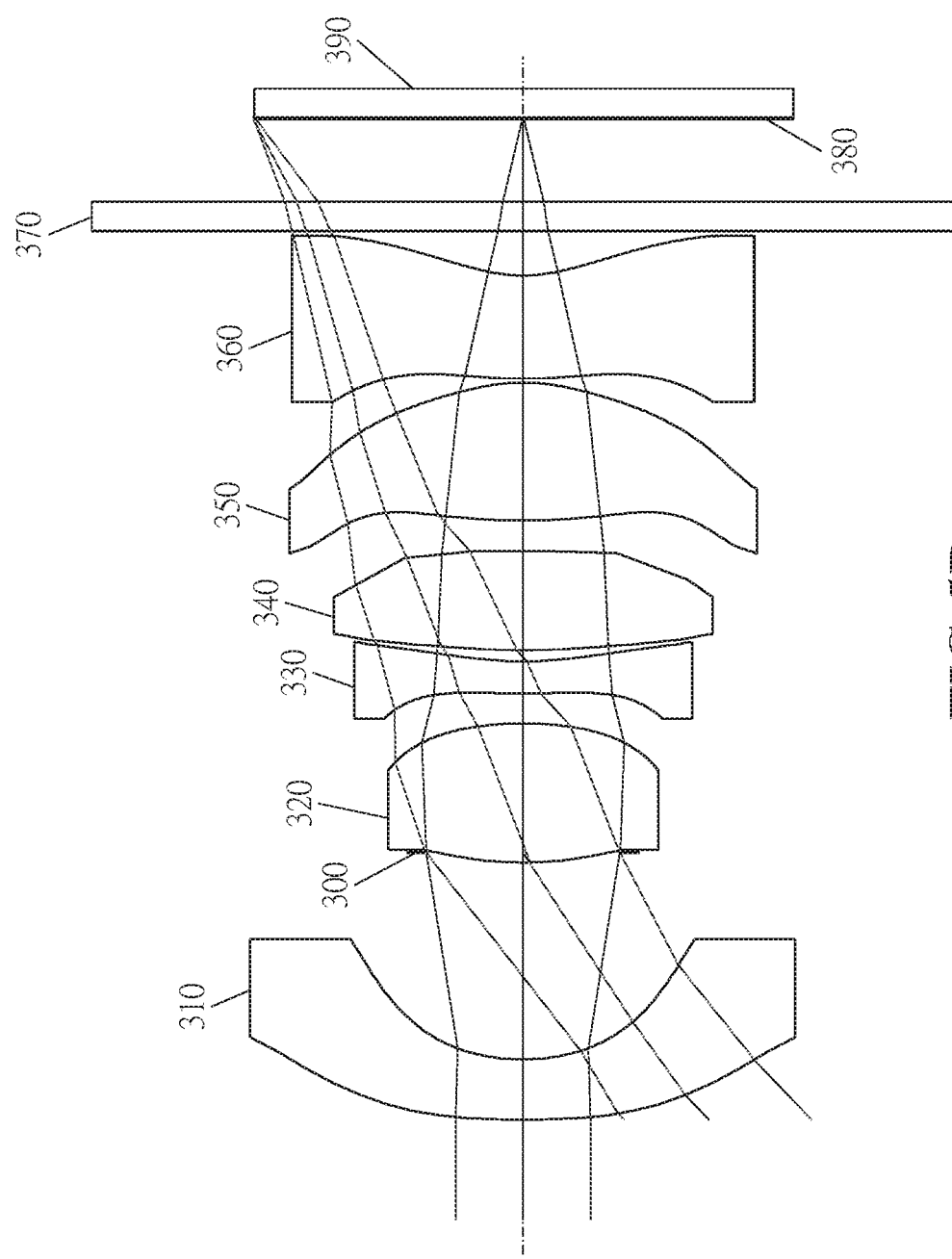
FIG. 5B is a schematic diagram showing the optical imaging lens device in a longitudinal axis in accordance with the third embodiment of the present invention.
Figure 5C:
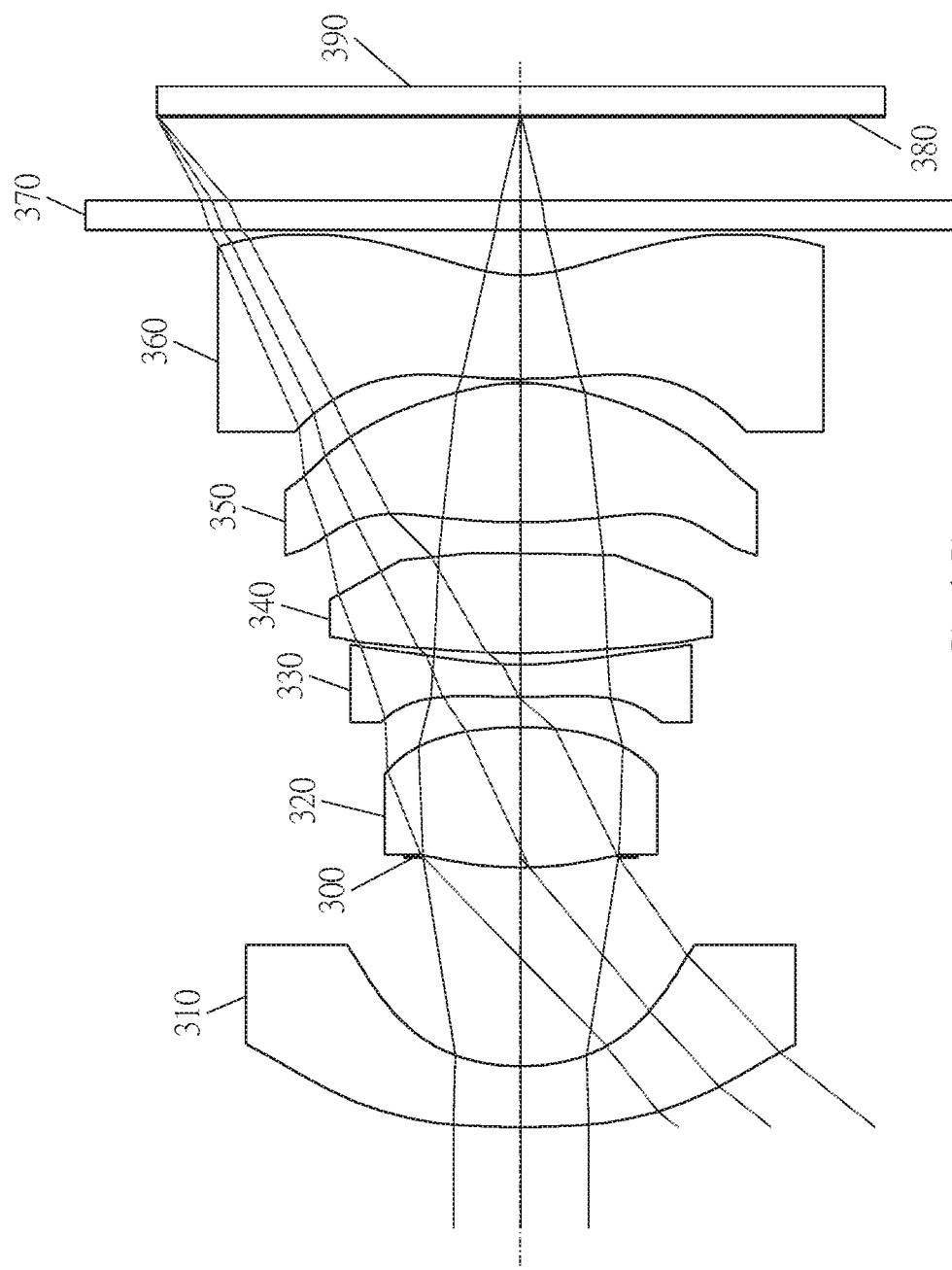
FIG. 5C is a schematic diagram showing an optical imaging lens device in a horizontal axis in accordance with the third embodiment of the present invention.
Figure 6A:
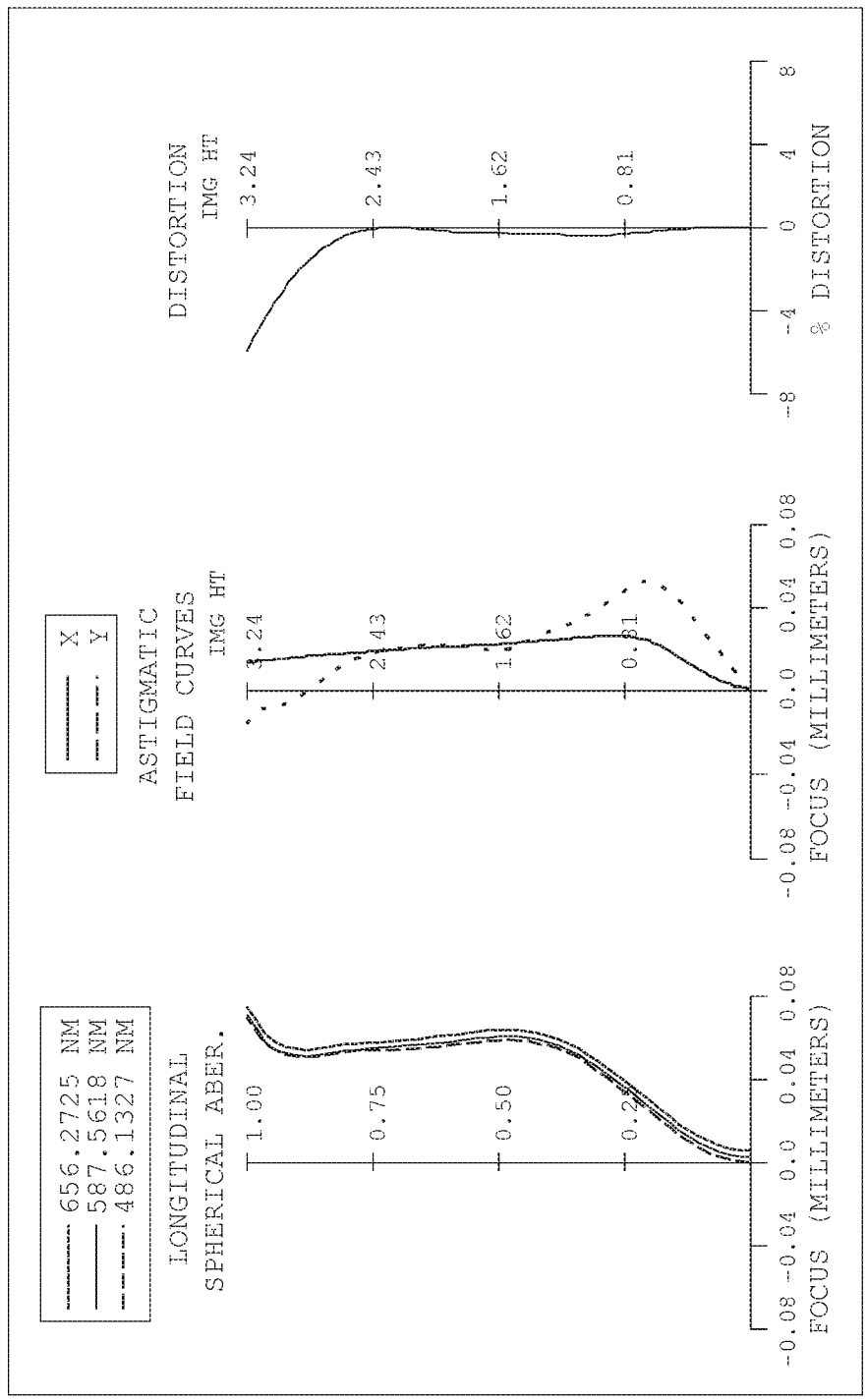
FIG. 6A is a schematic diagram showing the longitudinal spherical aberration curve, the astigmatic field curve and the distortion curve of the optical imaging lens device of the FIG. 5A according to the third embodiment.
Figure 6B:
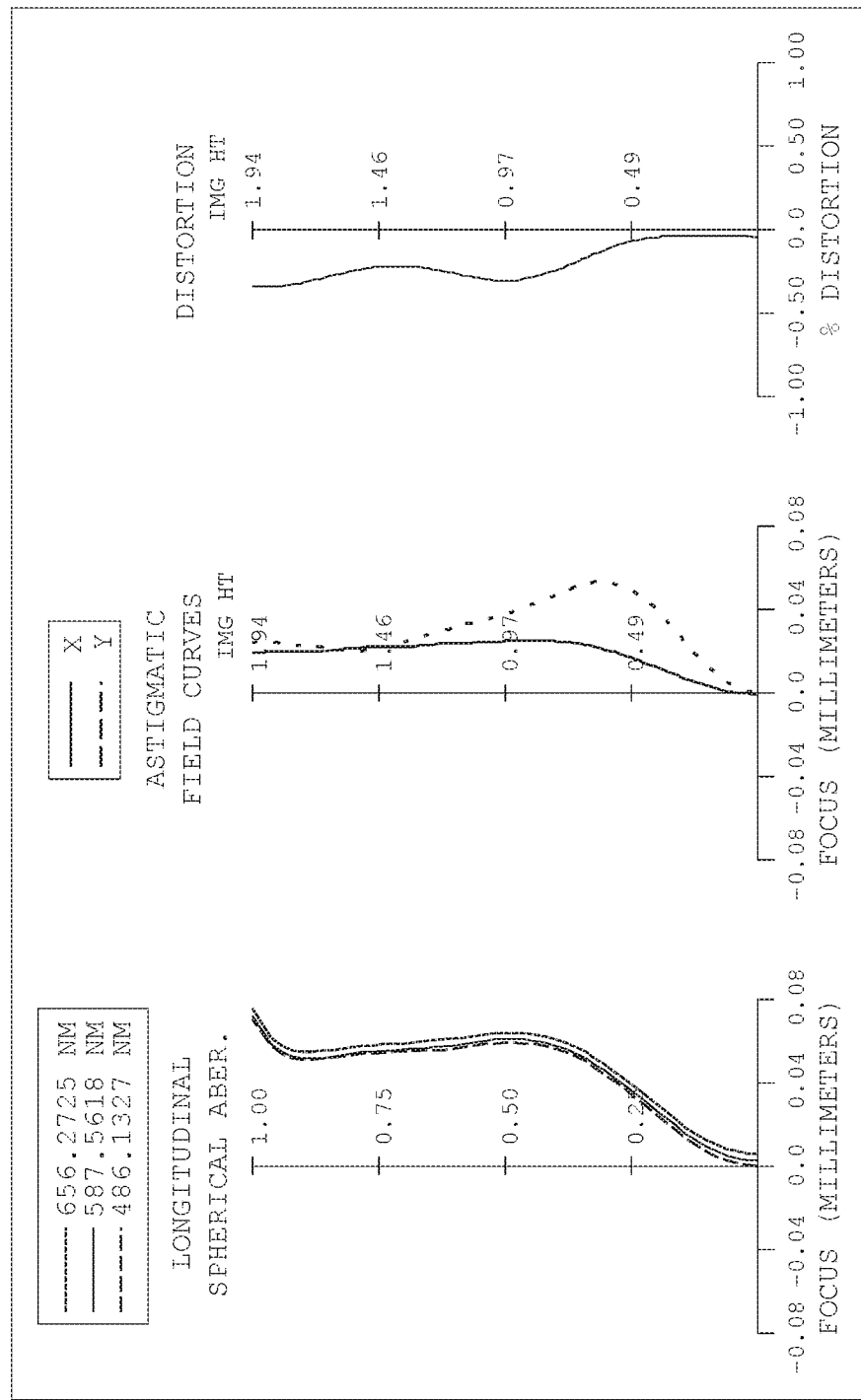
FIG. 6B is a schematic diagram showing the longitudinal spherical aberration curve, the astigmatic field curve and the distortion curve of the optical imaging lens device of the FIG. 5B according to the third embodiment.
Figure 6C:
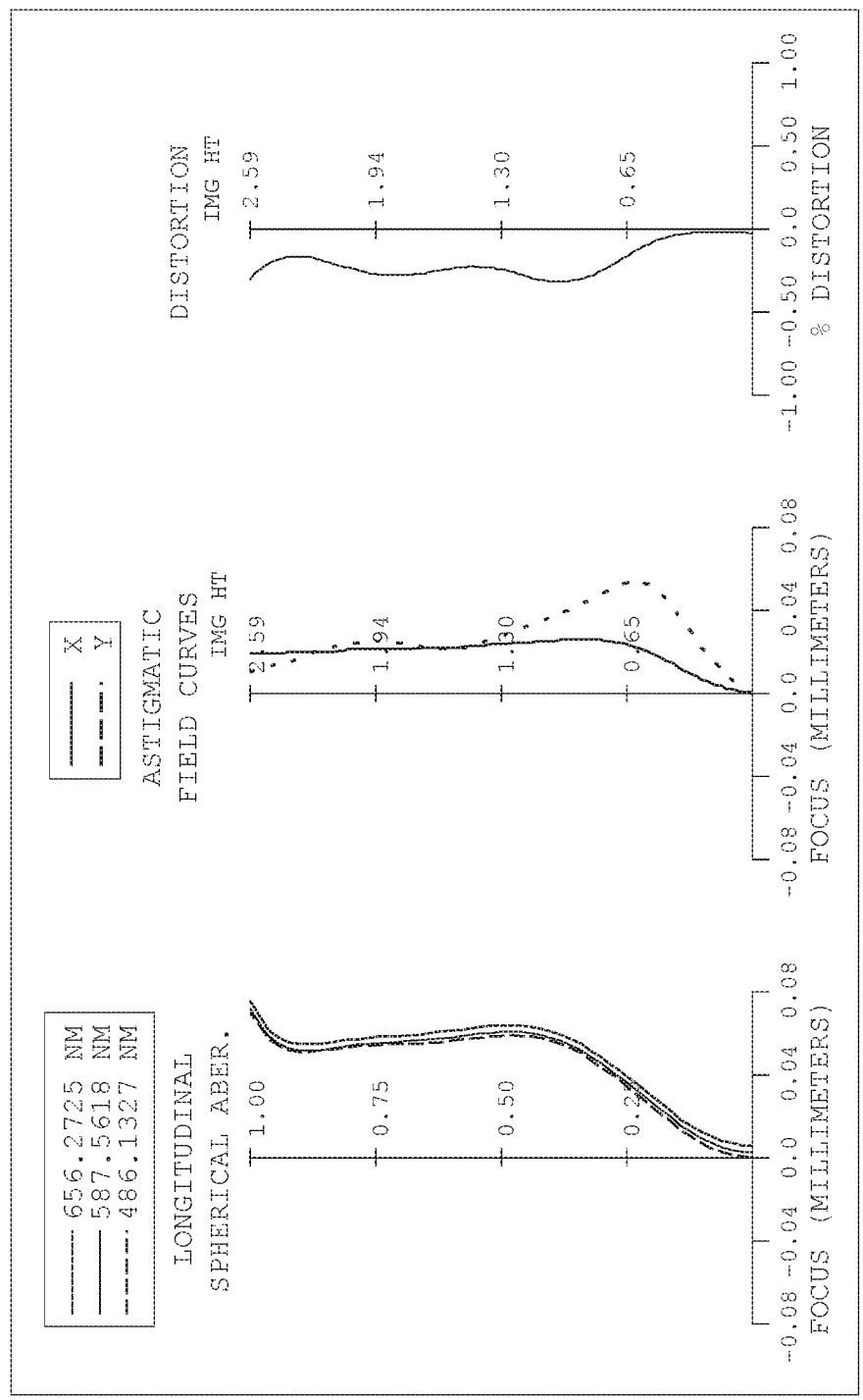
FIG. 6C is a schematic diagram showing the longitudinal spherical aberration curve, the astigmatic field curve and the distortion curve of the optical imaging lens device of the FIG. 5C according to the third embodiment.
Figure 7:
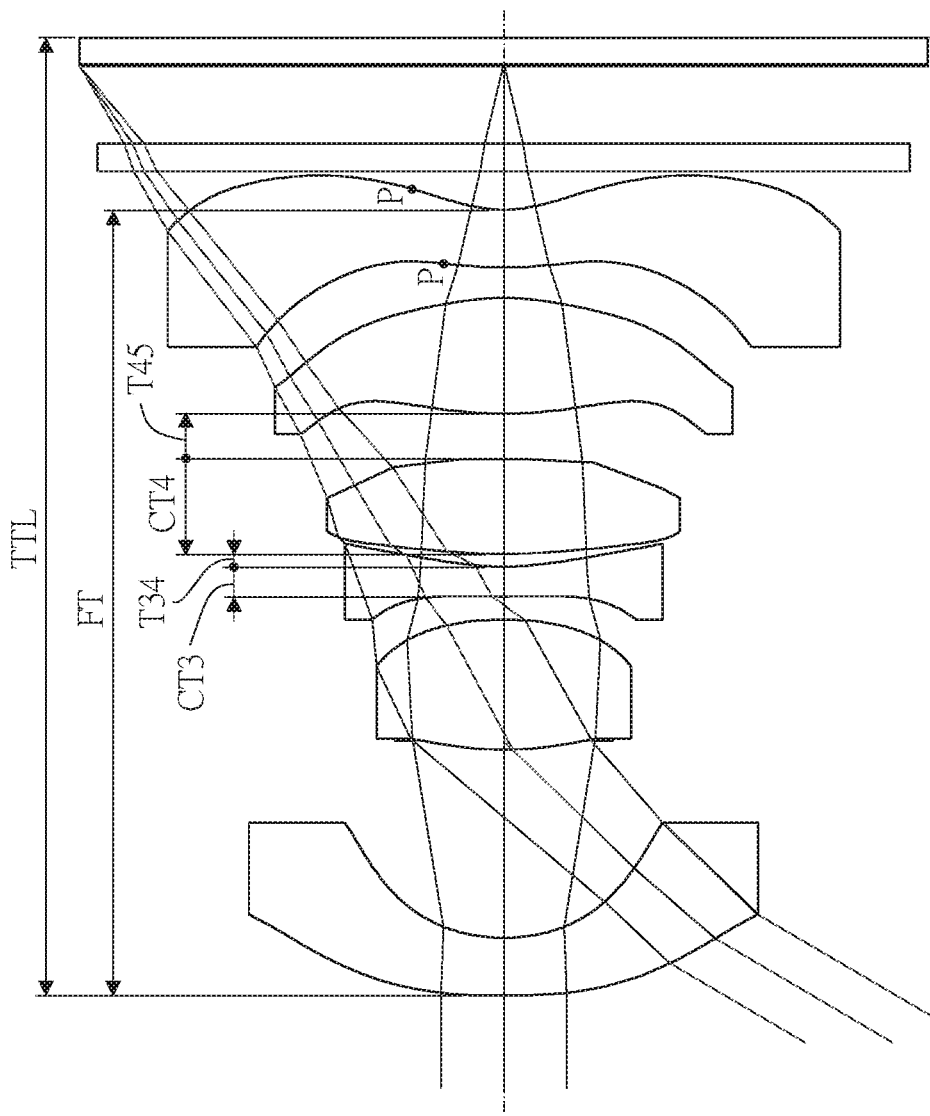
FIG. 7 is a schematic diagram showing the parameters and features of the first embodiment of the present invention.
Figure 8:
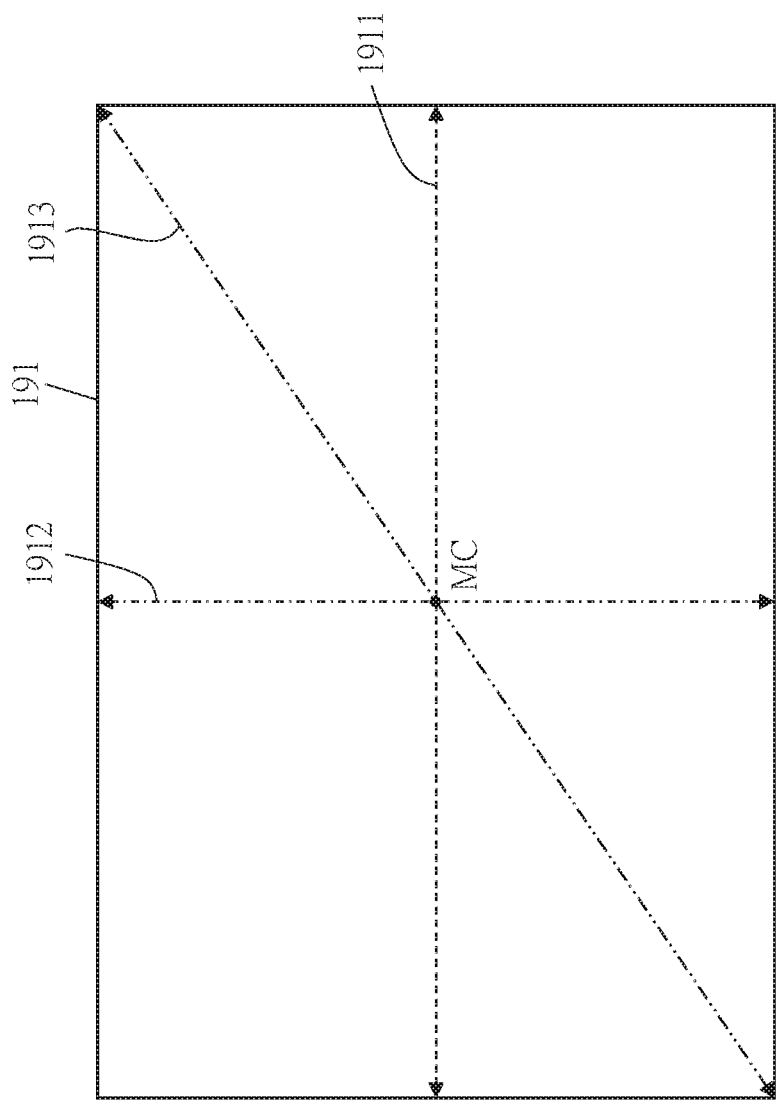
FIG. 8 is a schematic diagram showing respective axes of the sensing area of an image sensor in accordance with the first embodiment of the present invention.

The fifth lens element may have positive refractive power and the object-side surface that is convex in a paraxial region thereof. The sixth lens element may have negative refractive power, the object-side surface that is convex in a paraxial region thereof, and the image-side surface that is concave in a paraxial region thereof, the object-side surface and the image-side surface of the sixth lens element may be provided with at least one inflection point, see the inflection point P as shown in FIG. 7. At least one of the object-side surface and the image-side surface of the sixth lens element has a sagittal height (first sagittal height) in a first axis, a sagittal height (second sagittal height) in a second axis and a sagittal height (third sagittal height) in a third axis, at least two of the first, second and third sagittal heights are different, and the first axis, the second axis and the third axis are not parallel to one another. The first axis can be, for example, a horizontal axis 1911 of a sensing area 191 of an image sensor as shown in FIG. 8, the second axis can be, for example, a vertical (longitudinal) axis 1912 of the sensing area 191 of the image sensor as shown in FIG. 8, the third axis can be, for example, a diagonal axis 1913 of the sensing area 191 of the image sensor as shown in FIG. 8, and all these axes are centered on the geometric center MC of the sensing area 191 of the image sensor.

Please refer to the parameters and characteristics of the optical imaging lens device of the first embodiment shown in FIG. 7 below to illustrate the property of the optical imaging lens device of the present invention.

A focal length of the optical imaging lens device is f, a focal length of the fourth lens element is f4, a focal length of the fifth lens element is f5, and if the optical imaging lens device satisfies the following condition (1): $0<(\equiv|f/f5|-|f/f4|)<1.3$, the field of view may be increased and the sensitivity of assembly may be maintained at a suitable level. In addition, the optical imaging lens device may have a suitable back focal length.

An Abbe number of the third lens element is V3, an Abbe number of the fourth lens element is V4, an Abbe number of the fifth lens element is V5, an Abbe number of the sixth lens element is V6, a refractive index of the third lens element is N3, a refractive index of the fourth lens element is N4, a refractive index of the fifth lens element is N5, a refractive index of the sixth lens element is N6, and if the optical imaging lens device satisfies the following condition (2): $70<(V3/N3+V4/N4+V5/N5+V6/N6)<125$, the chromatic aberrations of the optical imaging lens device may be well corrected.

A distance from the object-side surface of the first lens element to an image plane along the optical axis is TTL, a distance from the object-side surface of the first lens element to the image-side surface of the sixth lens element along the optical axis is FT, and if the optical imaging lens device satisfies the following condition (3): $0.4<(FT/TTL)<0.92$, the image distortion and aberration caused by the wide field of view may be greatly reduced.

A distance between the object-side surface and the image-side surface of the third lens element in the optical axis is CT3 (that is, a distance from the object-side surface of the third lens element to the image plane along the optical axis), a distance between the object-side surface and the image-side surface of the fourth lens element in the optical axis is CT4 (that is, a distance from the object-side surface of the fourth lens element to the image plane along the optical axis), and if the optical imaging lens device satisfies the following condition (4): $0.1<CT3/CT4<0.5$, the thicknesses of the third lens element and the fourth lens element may be balanced to compress the converging distance of light, thereby shortening the total track length of the optical imaging lens device.

The Abbe number of the third lens element is V3, the Abbe number of the fourth lens element is V4, the Abbe number of the fifth lens element is V5, the Abbe number of the sixth lens element is V6, and if the optical imaging lens device satisfies the following condition (5): $(V4+V5)-(V3+V6)>65$, it may be ensured that the chromatic aberration reaches a more balanced state in various aberrations. The distance from the object-side surface of the first lens element to the image plane along the optical axis is TTL, the maximum imaging height of the optical imaging lens device is ImgH, and if the optical imaging lens device satisfies the following condition (6): $(2*TTL)/ImgH<2.35$, the miniaturization of the optical imaging lens device may be achieved, so as to be used in light-weight portable electronic products.

A focal length of the second lens element is f2, the focal length of the optical imaging lens device is f, and if the optical imaging lens device satisfies the following condition (7): $1<f2/f<1.24$, the distortion caused by the wide field of view may be effectively reduced and the astigmatism may be corrected.

A radius of curvature of the object-side surface of the fifth lens element is R9, a radius of curvature of the image-side surface of the fifth lens element is R10, and if the optical imaging lens device satisfies the following condition (8): $-1<(R9+R10)/(R9-R10)<0.8$, the sensitivity of the optical lens system to tolerance can be reduced, increasing the production yield.

The focal length of the optical imaging lens device is f, a distance between the image-side surface of the third lens element and the object-side surface of the fourth lens element in the optical axis is T34, a distance between the image-side surface of the fourth lens element and the object-side surface of the fifth lens element in the optical axis is T45, and if the optical imaging lens device satisfies the following condition (9): $0.5<(T34+T45)*10/f<2.5$, the maximal field of view of the optical imaging lens device may be effectively increased.

The Abbe number of the fourth lens element is V4, the Abbe number of the sixth lens element is V6, and if the optical imaging lens device satisfies the following condition (10): $1.5<V4/V6<3$, the image chromatic aberrations caused by the wide field of view may be effectively reduced.

Details of the implementation aspects of the above embodiments are described as follows.

An optical imaging lens device in accordance with a first embodiment of the present invention shown in FIGS. 1A-1C, 2A-2C and 7 comprises, in order from an object side to an image side: a first lens element 110, an aperture stop 100, a second lens element 120, a third lens element 130, a fourth lens element 140, a fifth lens element 150, a sixth lens element 160, an IR filter 170, and an image sensor 190 disposed on an image plane 180.

The first lens element 110 with negative refractive power has an object-side surface 111 being convex in a paraxial region thereof and an image-side surface 112 being concave in a paraxial region thereof, both the object-side and image-side surfaces 111, 112 are aspheric, and the first lens element 110 is made of plastic material.

The second lens element 120 with positive refractive power has an object-side surface 121 being convex in a paraxial region thereof and an image-side surface 122 being convex in a paraxial region thereof, both the object-side and image-side surfaces 121, 122 are aspheric, and the second lens element 120 is made of plastic material.

The third lens element 130 with negative refractive power has an object-side surface 131 being convex in a paraxial region thereof and an image-side surface 132 being concave in a paraxial region thereof, both the object-side and image-side surfaces 131, 132 are aspheric, and the third lens element 130 is made of plastic material.

The fourth lens element 140 with positive refractive power has an object-side surface 141 being convex in a paraxial region thereof and an image-side surface 142 being concave in a paraxial region thereof, both the object-side and image-side surfaces 141, 142 are aspheric, and the fourth lens element 140 is made of plastic material.

The fifth lens element 150 with positive refractive power has an object-side surface 151 being convex in a paraxial region thereof and an image-side surface 152 being concave in a paraxial region thereof, both the object-side and image-side surfaces 151, 152 are aspheric, and the fifth lens element 150 is made of plastic material.

The sixth lens element 160 with negative refractive power has an object-side surface 161 being convex in a paraxial region thereof and an image-side surface 162 being concave in a paraxial region thereof, both the object-side and image-side surfaces 161, 162 are free-form surfaces and provided with at least one inflection point, a sagittal height in a horizontal axis, a sagittal height in a vertical axis and a sagittal height in a diagonal axis of the object-side surface 161 of the sixth lens element 160 are different, and the sixth lens element 160 is made of plastic material.

The IR filter 150 is a glass plate, is located between the sixth lens element 160 and the image plane 180 (at the image side of the sixth lens element 160), and has no influence on the focal length of the optical imaging lens device.

The detailed parameters of the components in the first embodiment are shown in Table 1, wherein a focal length of the optical imaging lens device is f, a f-number of the optical imaging lens device is Fno, half of the maximal field of view of the optical imaging lens device is HFOV, and the units of the radius of curvature, the surface spacing and the focal length in table 1 are expressed in mm.

TABLE 1 f(focal length) = 2 mm, Fno = 2.1, HFOV = 59.5 deg., the reference wavelength is 587.6 nm

| Surface | | Curvature Radius | Surface spacing | Focal length | index | Abbe # |
|---|---|---|---|---|---|---|
| 0 | Object | Plane | Infinity | — | — | — |
| 1 | Lens 1 | 6.3842 | 0.44 | −3.39664 | 1.5445 | 55.99 |
| 2 | | 1.3980 | 1.50 | | | |
| 3 | Aperture stop | — | −0.07 | — | — | — |
| 4 | Lens 2 | 2.5349 | 0.99 | 2.31283 | 1.559 | 41.4 |
| 5 | | −2.2693 | 0.18 | | | |
| 6 | Lens 3 | 13.1548 | 0.23 | −4.26239 | 1.671 | 19.2 |
| 7 | | 2.3339 | 0.10 | | | |
| 8 | Lens 4 | 4.2008 | 0.72 | 8.07612 | 1.5445 | 55.99 |
| 9 | | 90.0000 | 0.35 | | | |
| 10 | Lens 5 | 3.4453 | 0.88 | 2.23082 | 1.5445 | 55.99 |
| 11 | | −1.7041 | 0.24 | | | |
| 12 | Lens 6 | 3.7425 | 0.41 | −2.53457 | 1.671 | 19.2 |
| 13 | | 1.2191 | 0.32 | | | |
| 14 | IR filter | Plane | 0.21 | — | 1.518 | 64.2 |
| 15 | | Plane | 0.60 | | | |
| 16 | Image plane | Plane | — | — | — | — |

The equation for the aspheric surface profiles of the above lens elements in the first embodiment is expressed as follows:

$$X(Y) = (Y^2/R) / \left( 1 + \sqrt{1 - (1+k) \times (Y/R)^2} \right) + \sum_i (Ai) \times (Y^i)$$

X represents the relative distance between a point on the aspheric surface spaced at a distance Y from the optical axis and the tangential plane at the vertex of the aspheric surface in the optical axis;

Y represents a vertical distance from the point on the curve of the aspheric surface to the optical axis;

R represents the curvature radius;

k represents the conic constant;

Ai represents the i-th order aspheric coefficient.

The equation for the free-form surface profiles of the above lens elements in the first embodiment is expressed as follows:

$$\tilde{z}(\tilde{x},\tilde{y}) = cr^2/(1+\sqrt{1-(1+k)c^2r^2}) + \Sigma_{j=1}^{72} C_{j+8} \, ZFE(j)$$

z represents the position value of a point on the aspheric surface at a height r from the optical axis relative to the vertex of the aspheric surface;

R represents a radius of curvature of a lens surface in a paraxial region thereof;

c is a curvature of a lens surface in a paraxial region thereof and is equal to 1/R;

r represents a vertical distance from the point on the aspheric surface to the optical axis;

k represents the conic constant;

ZFE(j) represents the jth order Zernike multinomial; and $C_{j+8}$ represents a coefficient of ZFE(j).

The aspheric surface data of the first embodiment is shown in tables 2 and 3, the surface numbers 1-11 represent the surfaces sequentially arranged from the object-side to the image-side, k represents the conic coefficient of the equation of the aspheric surface profiles, and A4-A20 represent the high-order aspheric coefficients.

TABLE 2

Aspheric Coefficients

| Surface # | 1 | 2 | 4 | 5 |
|---|---|---|---|---|
| K= | −2.1352E+00 | −1.1631E−01 | −1.0590E+00 | 1.3352E+00 |
| A4= | 8.7759E−02 | 1.3358E−01 | −6.4842E−02 | −3.2310E−02 |
| A6= | −3.7382E−02 | 4.2656E−02 | 3.2883E−01 | −3.0098E−01 |
| A8= | 8.2053E−03 | −1.2663E−01 | −1.6190E+00 | 7.0414E−01 |
| A10= | 9.4747E−04 | 1.1789E−01 | 3.5009E+00 | −1.0643E+00 |
| A12= | −1.1494E−03 | −2.8592E−02 | −3.8066E+00 | 8.2802E−01 |
| A14= | 2.6462E−04 | −9.2443E−03 | 1.3503E+00 | −2.8603E−01 |
| A16= | −2.0910E−05 | 0.0000E+00 | 0.0000E+00 | 0.0000E+00 |

| Surface # | 6 | 7 | 8 | 9 |
|---|---|---|---|---|
| K= | −4.7955E+00 | −1.8093E+00 | −2.2697E+00 | −2.6770E+00 |
| A4= | −1.3708E−01 | −1.2183E−01 | −1.4567E−01 | −8.8233E−02 |
| A6= | −1.4537E−01 | 8.8153E−02 | 2.6124E−01 | −2.5033E−01 |
| A8= | −1.8672E−02 | −9.3652E−02 | −2.5763E−01 | 5.8131E−01 |
| A10= | 3.9767E−01 | 9.8347E−02 | 1.1686E−01 | −6.8555E−01 |
| A12= | −5.0305E−02 | −5.3971E−02 | −1.1589E−02 | 4.7072E−01 |
| A14= | 1.9743E−01 | 1.1107E−02 | −6.0144E−03 | −1.7883E−01 |
| A16= | −4.7955E+00 | 0.0000E+00 | 1.5346E−03 | 2.9284E−02 |
| A18= | −1.3708E−01 | 0.0000E+00 | 0.0000E+00 | 0.0000E+00 |
| A20= | −1.4537E−01 | 0.0000E+00 | 0.0000E+00 | 0.0000E+00 |

TABLE 3

Aspheric Coefficients

| Surface # | 10 | 11 |
|---|---|---|
| K= | −6.6381E+00 | −9.8550E−01 |
| A4= | 9.1974E−02 | 4.0097E−01 |
| A6= | −2.9384E−01 | −6.8563E−01 |
| A8= | 2.9457E−01 | 7.0812E−01 |
| A10= | −1.8052E−01 | −4.6820E−01 |
| A12= | 5.6689E−02 | 1.9333E−01 |
| A14= | −6.9810E−03 | −4.9022E−02 |
| A16= | 5.3226E−05 | 7.4072E−03 |
| A18= | 0.0000E+00 | −6.1271E−04 |
| A20= | 0.0000E+00 | 2.1396E−05 |

The free-form surface data of the first embodiment is shown in table 4, the surface numbers 12-13 represent the surfaces sequentially arranged from the object-side to the image-side, k represents the conic coefficient of the equation of the aspheric surface profiles, and Term 1-Term 100 represent the 1st order to 100th order Zernike coefficients.

TABLE 4

Zernike Coefficients

| Surface # | 12 | 13 |
|---|---|---|
| K= | 1.7397E+00 | −1.0883E+00 |
| Term 1= | −4.7124E−01 | −1.2011E+00 |
| Term 4= | −6.6057E−01 | −1.5328E+00 |
| Term 5= | −1.9318E−02 | −2.0946E−01 |
| Term 9= | −1.5714E−01 | −2.1560E−01 |
| Term 12= | −1.2954E−02 | −1.4105E−01 |
| Term 17= | −2.1389E−02 | −2.0260E−01 |
| Term 16= | 1.5412E−02 | 2.5153E−01 |
| Term 21= | −1.4113E−03 | −2.6670E−02 |
| Term 25= | −1.8548E−02 | −2.3388E−02 |
| Term 28= | −9.3574E−03 | −7.5744E−02 |
| Term 32= | 3.8321E−03 | 1.9357E−02 |
| Term 36= | 5.6485E−03 | 2.6002E−02 |
| Term 37= | −1.0472E−02 | −9.6170E−02 |
| Term 41= | −1.6141E−03 | −7.7727E−03 |
| Term 45= | 3.0199E−03 | 1.2519E−02 |
| Term 49= | 2.0931E−03 | −4.8039E−03 |
| Term 52= | −2.1475E−03 | −1.6135E−02 |
| Term 56= | 3.3093E−04 | 3.0517E−03 |
| Term 60= | 6.4289E−04 | 1.4887E−03 |
| Term 64= | 1.2317E−03 | 4.7725E−03 |
| Term 81= | 1.5367E−03 | −3.3034E−03 |
| Term 100= | −9.8095E−04 | 9.1317E−04 |

The results of substituting the parameters of the optical imaging lens device of the first embodiment in the above conditions (1) to (10) are shown in Table 5.

TABLE 5

| | | | |
|---|---|---|---|
| ($\|f/f5\| - \|f/f4\|$) | 0.659 | (R9 + R10)/(R9 − R10) | 0.338 |
| V3/N3 + V4/N4 + V5/N5 + V6/N6 | 94.78 | (T34 + T45)*10/f | 2.217 |
| FT/TTL | 0.8410 | V4/V6 | 2.905 |
| CT3/CT4 | 0.3183 | (2*TTL)/ImgH | 2.194 |
| (V4 + V5) − (V3 + V6) | 73.3 | f2/f | 1.134 |

It can be appreciated from Table 5 that the optical imaging lens device of the first embodiment meet the above conditions (1) to (10).

An optical imaging lens device in accordance with a second embodiment of the present invention shown in FIGS. 3A-3C and 4A-4C comprises, in order from an object side to an image side: a first lens element 210, an aperture stop 200, a second lens element 220, a third lens element 230, a fourth lens element 240, a fifth lens element 250, a sixth lens element 260, an IR filter 270, and an image sensor 290 disposed on an image plane 280.

The first lens element 210 with negative refractive power has an object-side surface 211 being convex in a paraxial region thereof and an image-side surface 212 being concave in a paraxial region thereof, both the object-side and image-side surfaces 211, 212 are aspheric, and the first lens element 210 is made of plastic material.

The second lens element 220 with positive refractive power has an object-side surface 221 being convex in a paraxial region thereof and an image-side surface 222 being convex in a paraxial region thereof, both the object-side and image-side surfaces 221, 222 are aspheric, and the second lens element 220 is made of plastic material.

The third lens element 230 with negative refractive power has an object-side surface 231 being convex in a paraxial region thereof and an image-side surface 232 being concave in a paraxial region thereof, both the object-side and image-side surfaces 231, 232 are aspheric, and the third lens element 230 is made of plastic material.

The fourth lens element 240 with positive refractive power has an object-side surface 241 being convex in a paraxial region thereof and an image-side surface 242 being convex in a paraxial region thereof, both the object-side and image-side surfaces 241, 242 are aspheric, and the fourth lens element 240 is made of plastic material.

The fifth lens element 250 with positive refractive power has an object-side surface 251 being convex in a paraxial region thereof and an image-side surface 252 being convex in a paraxial region thereof, both the object-side and image-side surfaces 251, 252 are aspheric, and the fifth lens element 250 is made of plastic material.

The sixth lens element 260 with negative refractive power has an object-side surface 261 being convex in a paraxial region thereof and an image-side surface 262 being concave in a paraxial region thereof, both the object-side and image-side surfaces 261, 262 are free-form surfaces and provided with at least one inflection point, a sagittal height in a horizontal axis, a sagittal height in a vertical axis and a sagittal height in a diagonal axis of the object-side surface 261 of the sixth lens element 260 are different, and the sixth lens element 260 is made of plastic material.

The IR filter 270 is a glass plate, is located between the sixth lens element 260 and the image plane 280 (at the image-side of the sixth lens element 260), and has no influence on the focal length of the optical imaging lens device.

The detailed parameters of these components in the second embodiment is shown in Table 6, wherein a focal length of the optical imaging lens device is f, a f-number of the optical imaging lens device is Fno, half of the maximal field of view of the optical imaging lens device is HFOV, and the units of the radius of curvature, the surface spacing and the focal length in table 6 are expressed in mm.

TABLE 6 f(focal length) = 1.94 mm, Fno = 2.1, HFOV = 59.9 deg., the reference wavelength is 587.6 nm

| Surface | | Curvature Radius | Surface spacing | Focal length | index | Abbe # |
|---|---|---|---|---|---|---|
| 0 | Object | Plane | Infinity | — | — | — |
| 1 | Lens 1 | 0.8449 | 0.40 | −4.501678 | 1.535 | 55.7 |
| 2 | | 0.5233 | 1.64 | | | |
| 3 | Aperture stop | — | −0.06 | — | — | — |
| 4 | Lens 2 | 2.5874 | 0.95 | 2.22688 | 1.558 | 39.8 |
| 5 | | −2.0819 | 0.05 | | | |
| 6 | Lens 3 | 79.7419 | 0.23 | −4.02918 | 1.671 | 19.2 |
| 7 | | 2.6134 | 0.15 | | | |
| 8 | Lens 4 | 5.2869 | 0.78 | 8.86641 | 1.541 | 55.8 |
| 9 | | −49.8964 | 0.21 | | | |
| 10 | Lens 5 | 3.0382 | 0.84 | 2.10447 | 1.5445 | 55.99 |
| 11 | | −1.6576 | 0.19 | | | |
| 12 | Lens 6 | 3.5769 | 0.33 | −3.59187 | 1.671 | 19.2 |
| 13 | | 1.0261 | 0.26 | | | |
| 14 | IR filter | Plane | 0.21 | — | 1.518 | 64.2 |
| 15 | | Plane | 0.63 | | | |
| 16 | Image plane | Plane | — | — | — | — |

In the second embodiment, the equations for the aspheric surface and free-form surface profiles of the aforementioned lens elements are the same as those in the first embodiment, the aspheric coefficients are shown in Tables 7 and 8, the Zernike coefficients are shown in Table 9. Also, the definitions of these parameters shown in the following tables are the same as those stated in the first embodiment with corresponding values for the second embodiment, so an explanation in this regard will not be provided again.

TABLE 7

Aspheric Coefficients

| Surface # | 1 | 2 | 4 | 5 |
|---|---|---|---|---|
| K= | −2.2041E+00 | −8.8551E−01 | 4.6895E+00 | 3.1710E+00 |
| A4= | 2.7579E−01 | 1.0554E−01 | −2.6240E−01 | 1.3153E−01 |
| A6= | −2.1579E−01 | −1.8325E−01 | 1.8523E+00 | −1.5540E+00 |
| A8= | 2.8277E−02 | −4.1198E−01 | −9.4667E+00 | 4.2593E+00 |
| A10= | 1.0802E−01 | 1.5646E+00 | 2.4616E+01 | −5.6323E+00 |
| A12= | −8.9862E−02 | −1.3831E+00 | −3.2687E+01 | 3.3790E+00 |
| A14= | 2.8301E−02 | 3.3381E−01 | 1.6954E+01 | −6.7341E−01 |
| A16= | −3.2660E−03 | 0.0000E+00 | 0.0000E+00 | 0.0000E+00 |

TABLE 7-continued

| Aspheric Coefficients | | | | |
|---|---|---|---|---|
| Surface # | 6 | 7 | 8 | 9 |
| K= | −5.4998E+00 | −6.4792E−01 | −8.0693E+00 | −7.0283E+00 |
| A4= | −1.0022E−01 | −1.5183E−01 | −1.3650E−01 | −2.9011E−02 |
| A6= | −7.7184E−01 | 3.2351E−02 | 2.7375E−01 | −4.0382E−01 |
| A8= | 1.4945E+00 | 1.7323E−01 | −4.4892E−01 | 7.2692E−01 |
| A10= | −5.7280E−01 | −2.2710E−01 | 5.0390E−01 | −7.4756E−01 |
| A12= | −1.1194E+00 | 1.0628E−01 | −3.6943E−01 | 4.6612E−01 |
| A14= | 8.4363E−01 | −1.6313E−02 | 1.5684E−01 | −1.6505E−01 |
| A16= | 0.0000E+00 | 0.0000E+00 | −2.7679E−02 | 2.5814E−02 |
| A18= | 0.0000E+00 | 0.0000E+00 | 0.0000E+00 | 0.0000E+00 |
| A20= | 0.0000E+00 | 0.0000E+00 | 0.0000E+00 | 0.0000E+00 |

TABLE 8

| Aspheric Coefficients | | |
|---|---|---|
| Surface # | 10 | 11 |
| K= | 1.7714E+00 | −1.2440E+00 |
| A4= | 7.3277E−02 | 3.7565E−01 |
| A6= | −2.7014E−01 | −6.5546E−01 |
| A8= | 2.6329E−01 | 8.5749E−01 |
| A10= | −1.5838E−01 | −7.6221E−01 |
| A12= | 5.0062E−02 | 4.3498E−01 |
| A14= | −6.5383E−03 | −1.5734E−01 |
| A16= | 1.1548E−04 | 3.4973E−02 |
| A18= | 0.0000E+00 | −4.3527E−03 |
| A20= | 0.0000E+00 | 2.3142E−04 |

TABLE 2

| Zernike Coefficients | | |
|---|---|---|
| Surface # | 12 | 13 |
| K= | 1.4500E+00 | −1.1026E+00 |
| Term 1= | −5.5186E−01 | −1.4128E+00 |
| Term 4= | −6.4054E−01 | −1.6278E+00 |
| Term 5= | −2.0354E−02 | −1.9121E−01 |
| Term 9= | −1.9886E−01 | −2.3120E−01 |
| Term 12= | −1.0137E−02 | −1.0102E−01 |
| Term 17= | −1.0828E−02 | −1.3766E−01 |
| Term 16= | 3.5636E−02 | 3.9279E−02 |
| Term 21= | 6.5504E−03 | 2.0296E−02 |
| Term 25= | −6.0521E−03 | −1.3404E−02 |
| Term 28= | −1.2320E−03 | −2.9214E−02 |
| Term 32= | 9.8818E−03 | 4.5731E−02 |
| Term 36= | 1.2670E−02 | 2.8967E−02 |
| Term 37= | −8.7282E−03 | −8.9495E−02 |
| Term 41= | 4.6482E−03 | 1.9981E−02 |
| Term 45= | 5.4624E−03 | 1.9374E−02 |
| Term 49= | 5.2356E−03 | −4.7931E−03 |
| Term 52= | −3.6920E−03 | −2.2586E−02 |
| Term 56= | 2.7595E−03 | 1.1348E−02 |
| Term 60= | 9.6698E−04 | 1.3678E−03 |
| Term 64= | 1.3912E−03 | 2.7586E−03 |
| Term 81= | −1.9892E−03 | −3.6094E−03 |
| Term 100= | −2.5435E−03 | 1.3074E−03 |

The results of substituting the parameters of the optical imaging lens device of the second embodiment in the above conditions (1) to (10) are shown in Table 10.

TABLE 10

| | | | |
|---|---|---|---|
| (f/f5 − f/f4) | 0.711 | (R9 + R10)/(R9 − R10) | 0.294 |
| V3/N3 + V4/N4 + V5/N5 + V6/N6 | 94.80 | (T34 + T45)*10/f | 1.854 |
| FT/TTL | 0.838 | V4/V6 | 2.902 |
| CT3/CT4 | 0.2959 | (2*TTL)/ImgH | 2.106 |
| (V4 + V5) − (V3 + V6) | 73.259 | f2/f | 1.129 |

It can be appreciated from Table 10 that the optical imaging lens devices of the second embodiment meet the above conditions (1) to (10).

An optical imaging lens device in accordance with a third embodiment of the present invention shown in FIGS. 5A-5C and 6A-6C comprises, in order from an object side to an image side: a first lens element 310, an aperture stop 300, a second lens element 320, a third lens element 330, a fourth lens element 340, a fifth lens element 350, a sixth lens element 360, an IR filter 370, and an image sensor 390 disposed on an image plane 380.

The first lens element 310 with negative refractive power has an object-side surface 311 being convex in a paraxial region thereof and an image-side surface 312 being concave in a paraxial region thereof, both the object-side and image-side surfaces 311, 312 are aspheric, and the first lens element 310 is made of plastic material.

The second lens element 320 with positive refractive power has an object-side surface 321 being convex in a paraxial region thereof and an image-side surface 322 being convex in a paraxial region thereof, both the object-side and image-side surfaces 321, 322 are aspheric, and the second lens element 320 is made of plastic material.

The third lens element 330 with negative refractive power has an object-side surface 331 being convex in a paraxial region thereof and an image-side surface 332 being concave in a paraxial region thereof, both the object-side and image-side surfaces 331, 332 are aspheric, and the third lens element 330 is made of plastic material.

The fourth lens element 340 with positive refractive power has an object-side surface 341 being convex in a paraxial region thereof and an image-side surface 342 being concave in a paraxial region thereof, both the object-side and image-side surfaces 341, 342 are aspheric, and the fourth lens element 340 is made of plastic material.

The fifth lens element 350 with positive refractive power has an object-side surface 351 being convex in a paraxial region thereof and an image-side surface 352 being convex in a paraxial region thereof, both the object-side and image-side surfaces 351, 352 are aspheric, and the fifth lens element 350 is made of plastic material.

The sixth lens element 360 with negative refractive power has an object-side surface 361 being convex in a paraxial region thereof and an image-side surface 362 being concave in a paraxial region thereof, both the object-side and image-side surfaces 361, 362 are free-form surfaces and provided with at least one inflection point, a sagittal height in a horizontal axis, a sagittal height in a vertical axis and a sagittal height in a diagonal axis of the object-side surface 261 of the sixth lens element 360 are different, and the sixth lens element 360 is made of plastic material.

The IR cut filter 370 is a glass plate, is located between the sixth lens element 360 and the image plane 380 (at the image-side of the sixth lens element 360), and has no influence on the focal length of the optical imaging lens device.

The detailed parameters of these components in the third embodiment is shown in Table 11, wherein a focal length of the optical imaging lens device is f, a f-number of the optical imaging lens device is Fno, half of the maximal field of view of the optical imaging lens device is HFOV, and the units of the radius of curvature, the surface spacing and the focal length in table 11 are expressed in mm.

TABLE 11 f(focal length) = 2.02 mm, Fno = 2.1, HFOV = 59.2 deg., the reference wavelength is 587.6 nm

| Surface | | Curvature Radius | Surface spacing | Focal length | index | Abbe # |
|---|---|---|---|---|---|---|
| 0 | Object | Plane | Infinity | — | — | — |
| 1 | Lens 1 | 8.7877 | 0.43 | −3.4973 | 1.544 | 55.9 |
| 2 | | 1.5367 | 1.49 | | | |

TABLE 11-continued f(focal length) = 2.02 mm, Fno = 2.1, HFOV = 59.2 deg., the reference wavelength is 587.6 nm

| Surface | | Curvature Radius | Surface spacing | Focal length | index | Abbe # |
|---|---|---|---|---|---|---|
| 3 | Aperture stop | — | −0.07 | — | — | — |
| 4 | Lens 2 | 2.3959 | 1.00 | 2.46869 | 1.553 | 42.7 |
| 5 | | −2.7026 | 0.22 | | | |
| 6 | Lens 3 | 8.0428 | 0.23 | −5.3770 | 1.671 | 19.2 |
| 7 | | 2.4631 | 0.08 | | | |
| 8 | Lens 4 | 4.4077 | 0.71 | 9.40253 | 1.544 | 55.9 |
| 9 | | 30.0612 | 0.22 | | | |
| 10 | Lens 5 | 6.3166 | 0.99 | 2.15836 | 1.544 | 55.9 |
| 11 | | −1.3626 | 0.22 | | | |
| 12 | Lens 6 | 3.4275 | 0.40 | −2.41784 | 1.671 | 19.2 |
| 13 | | 0.8824 | 0.47 | | | |
| 14 | IR-filter | Plane | 0.21 | — | 1.518 | 64.2 |
| 15 | | Plane | 0.60 | | | |
| 16 | Image | Plane | — | — | — | — |

In the third embodiment, the equations for the aspheric surface and free-form surface profiles of the aforementioned lens elements are the same as those of the first embodiment, the aspheric coefficients are shown in Tables 12 and 13, and the Zernike coefficients are shown in Table 14. Also, the definitions of these parameters shown in the following tables are the same as those stated in the first embodiment with corresponding values for the third embodiment, so an explanation in this regard will not be provided again.

TABLE 12

Aspheric Coefficients

| Surface # | 1 | 2 | 4 | 5 |
|---|---|---|---|---|
| K= | 5.9910E+00 | −1.3298E−01 | 6.6721E−01 | 2.0748E+00 |
| A4= | 9.0084E−02 | 1.3650E−01 | −8.4952E−02 | −8.4394E−02 |
| A6= | −4.0333E−02 | 3.9061E−02 | 4.2895E−01 | −1.4397E−01 |
| A8= | 1.1253E−02 | −1.1323E−01 | −2.1466E+00 | 3.2177E−01 |
| A10= | −7.5762E−04 | 1.1428E−01 | 4.9873E+00 | −5.6892E−01 |
| A12= | −6.0902E−04 | −3.5380E−02 | −5.8981E+00 | 5.1070E−01 |
| A14= | 1.7417E−04 | −3.9287E−03 | 2.5512E+00 | −2.0503E−01 |
| A16= | −1.4717E−05 | 0.0000E+00 | 0.0000E+00 | 0.0000E+00 |

| Surface # | 6 | 7 | 8 | 9 |
|---|---|---|---|---|
| K= | 6.7957E+00 | −2.0008E+00 | −5.5203E+00 | −3.8310E+00 |
| A4= | −2.1114E−01 | −1.8652E−01 | −1.6106E−01 | 1.7087E−02 |
| A6= | 8.5473E−02 | 2.4125E−01 | 1.8615E−01 | −5.0315E−01 |
| A8= | −4.4720E−01 | −2.6521E−01 | 6.4791E−02 | 8.6213E−01 |
| A10= | 5.9670E−01 | 1.5230E−01 | −3.3300E−01 | −8.8811E−01 |
| A12= | −3.4665E−01 | −2.2209E−02 | 2.8367E−01 | 5.6671E−01 |
| A14= | 7.6964E−02 | −5.8411E−03 | −9.6101E−02 | −2.0370E−01 |
| A16= | 0.0000E+00 | 0.0000E+00 | 1.1013E−02 | 3.1359E−02 |
| A18= | 0.0000E+00 | 0.0000E+00 | 0.0000E+00 | 0.0000E+00 |
| A20= | 0.0000E+00 | 0.0000E+00 | 0.0000E+00 | 0.0000E+00 |

TABLE 13

Aspheric Coefficients

| Surface # | 10 | 11 |
|---|---|---|
| K= | −5.9031E+00 | −1.1009E+00 |
| A4= | 1.5316E−01 | 2.6350E−01 |
| A6= | −3.7091E−01 | −2.9202E−01 |
| A8= | 3.2413E−01 | 2.1953E−01 |
| A10= | −1.7552E−01 | −1.6699E−01 |
| A12= | 4.8763E−02 | 1.2369E−01 |
| A14= | −4.0870E−03 | −6.7717E−02 |
| A16= | −3.1793E−04 | 2.2655E−02 |
| A18= | 0.0000E+00 | −4.0237E−03 |
| A20= | 0.0000E+00 | 2.8895E−04 |

TABLE 14

Zernike Coefficients

| Surface # | 12 | 13 |
|---|---|---|
| K= | 9.7736E−01 | −4.2381E+00 |
| Term 1= | −6.0222E−01 | −4.2972E−01 |
| Term 4= | −5.6863E−01 | −6.6197E−01 |
| Term 5= | 1.0131E−04 | −2.8171E−02 |
| Term 9= | −1.3925E−01 | −6.8072E−02 |
| Term 12= | 2.3452E−03 | −1.5815E−03 |
| Term 17= | −4.1866E−03 | −5.5031E−02 |
| Term 16= | 1.2954E−02 | 6.8923E−03 |
| Term 21= | 2.9004E−03 | 1.1544E−02 |
| Term 25= | −6.5207E−03 | −6.8463E−03 |
| Term 28= | −1.4243E−03 | −1.2976E−02 |
| Term 32= | 1.5591E−03 | 4.2263E−03 |
| Term 36= | 1.4137E−03 | 2.6698E−03 |
| Term 37= | −3.1963E−03 | −3.7753E−02 |
| Term 41= | −4.1011E−04 | −1.4773E−03 |
| Term 45= | 1.1303E−04 | −7.9677E−04 |
| Term 49= | 1.6632E−03 | −2.8216E−04 |
| Term 52= | −3.5809E−04 | −1.3417E−03 |
| Term 56= | −7.5027E−05 | 5.9394E−05 |
| Term 60= | −8.7966E−05 | 3.4464E−05 |
| Term 64= | −4.8713E−05 | −7.8743E−07 |
| Term 81= | −1.3637E−06 | 1.4670E−06 |
| Term 100= | 1.2293E−04 | −5.5056E−08 |

The results of substituting the parameters of the optical imaging lens device of the third embodiment in the above conditions (1) to (10) are shown in Table 15.

TABLE 15

| (|f/f5| − |f/f4|) | 0.731 | (R9 + R10)/(R9 − R10) | 0.645 |
|---|---|---|---|
| V3/N3 + V4/N4 + V5/N5 + V6/N6 | 94.78 | (T34 + T45)*10/f | 1.5 |
| FT/TTL | 0.823 | V4/V6 | 2.905 |
| CT3/CT4 | 0.3233 | (2*TTL)/ImgH | 2.224 |
| (V4 + V5) − (V3 + V6) | 73.307 | f2/f | 1.2 |

It can be appreciated from Table 15 that the optical imaging lens devices of the third embodiment meet the above conditions (1) to (10).

While we have shown and described various embodiments in accordance with the present invention, it should be clear to those skilled in the art that further embodiments may be made without departing from the scope of the present invention.

What is claimed is:

1. An optical imaging lens device, comprising a plurality of lens elements each having an object-side surface facing an object side and an image-side surface facing an image side, and the plurality of lens elements comprise, in order from the object side to the image side:

a first lens element with negative refractive power;
a second lens element with positive refractive power, having the image-side surface being convex in a paraxial region thereof;
a third lens element with negative refractive power, having the image-side surface being concave in a paraxial region thereof;
a fourth lens element with positive refractive power, having the object-side surface being convex in a paraxial region thereof;
a fifth lens element with positive refractive power, having the object-side surface being convex in a paraxial region thereof;
a sixth lens element with negative refractive power, having the object-side surface being convex in a paraxial region thereof and the image-side surface being concave in a paraxial region thereof, and the object-side surface and the image-side surface of the sixth lens element being provided with at least one inflection point,
wherein at least one of the object-side surface and the image-side surface of the sixth lens element has a first sagittal height in a first axis, a second sagittal height in a second axis and a third sagittal height in a third axis, at least two of the first, second and third sagittal heights are different, and the first axis, the second axis and the third axis are not parallel to one another and are perpendicular to an optical axis; and
wherein a focal length of the optical imaging lens device is f, a refractive index of the third lens element is N3, an Abbe number of the third lens element is V3, a focal length of the fourth lens element is f4, a refractive index of the fourth lens element is N4, an Abbe number of the fourth lens element is V4, a focal length of the fifth lens element is f5, a refractive index of the fifth lens element is N5, an Abbe number of the fifth lens element is V5, an Abbe number of the sixth lens element is V6, a refractive index of the sixth lens element is N6, a distance from the object-side surface of the first lens element to an image plane along the optical axis is TTL, a distance from the object-side surface of the first lens element to the image-side surface of the sixth lens element along the optical axis is FT, and the following condition is satisfied:

$0 < (|f/f5| − |f/f4|) < 1.3;$ $70 < (V3/N3 + V4/N4 + V5/N5 + V6/N6) < 125;$ or $0.4 < (FT/TTL) < 0.92.$

2. The optical imaging lens device as claimed in claim 1, wherein a distance between the object-side surface and the image-side surface of the third lens element in the optical axis is CT3, a distance between the object-side surface and the image-side surface of the fourth lens element in the optical axis is CT4, and the following condition is further satisfied:

$0.1 < CT3/CT4 < 0.5.$

3. The optical imaging lens device as claimed in claim 1, wherein the Abbe number of the third lens element is V3, the Abbe number of the fourth lens element is V4, the Abbe number of the fifth lens element is V5, the Abbe number of the sixth lens element is V6, and the following condition is further satisfied:

$(V4+V5)-(V3+V6)>65$

4. The optical imaging lens device as claimed in claim 1, wherein the distance from the object-side surface of the first lens element to the image plane along the optical axis is TTL, the maximum diagonal imaging height of the optical imaging lens device is ImgH, and the following condition is further satisfied:

$(2*TTL)/ImgH<2.35$.

5. The optical imaging lens device as claimed in claim 1, wherein a focal length of the second lens element is f2, the focal length of the optical imaging lens device is f, and the following condition is further satisfied:

$1<f2/f<1.24$.

6. The optical imaging lens device as claimed in claim 1, wherein a radius of curvature of the object-side surface of the fifth lens element is R9, a radius of curvature of the image-side surface of the fifth lens element is R10, and the following condition is further satisfied:

$-1<(R9+R10)/(R9-R10)<0.8$.

7. The optical imaging lens device as claimed in claim 1, wherein the focal length of the optical imaging lens device is f, a distance between the image-side surface of the third lens element and the object-side surface of the fourth lens element in the optical axis is T34, a distance between the image-side surface of the fourth lens element and the object-side surface of the fifth lens element in the optical axis is T45, and the following condition is further satisfied:

$0.5<(T34+T45)*10/f<2.5$.

8. The optical imaging lens device as claimed in claim 1, wherein the Abbe number of the fourth lens element is V4, the Abbe number of the sixth lens element is V6, and the following condition is further satisfied:

$1.5<V4/V6<3$.

9. The optical imaging lens device as claimed in claim 1, wherein at least one of the first, second, third, fourth and fifth lens elements is aspheric.

10. The optical imaging lens device as claimed in claim 1, wherein the object-side surface of the first lens element is convex in a paraxial region thereof, the image-side surface of the first lens element is concave in a paraxial region thereof, the object-side surface of the second lens element is convex in a paraxial region thereof; the object-side surface of the third lens element is convex in a paraxial region thereof, the image-side surface of the fourth lens element is concave in a paraxial region thereof, and the image-side surface of the fifth lens element is concave in a paraxial region thereof.

11. The optical imaging lens device as claimed in claim 1, wherein the object-side surface of the first lens element is convex in a paraxial region thereof, the image-side surface of the first lens element is concave in a paraxial region thereof, the object-side surface of the second lens element is convex in a paraxial region thereof; the object-side surface of the third lens element is convex in a paraxial region thereof, the image-side surface of the fourth lens element is convex in a paraxial region thereof, and the image-side surface of the fifth lens element is convex in a paraxial region thereof.

12. The optical imaging lens device as claimed in claim 1, wherein the object-side surface of the first lens element is convex in a paraxial region thereof, the image-side surface of the first lens element is concave in a paraxial region thereof, the object-side surface of the second lens element is convex in a paraxial region thereof; the object-side surface of the third lens element is convex in a paraxial region thereof, the image-side surface of the fourth lens element is concave in a paraxial region thereof, and the image-side surface of the fifth lens element is convex in a paraxial region thereof.

* * * * *